US012783797B2

(12) United States Patent
Onda

(10) Patent No.: US 12,783,797 B2
(45) Date of Patent: Nov. 3, 2026

(54) NON-TRANSITORY STORAGE MEDIUM STORING DOCUMENT EXTRACTION PROGRAM IN COMPUTER LANGUAGE PROCESSING, SEMANTICALLY SIMILAR DOCUMENT EXTRACTION METHOD, AND LANGUAGE PROCESSING APPARATUS

(71) Applicant: GAP CO., LTD., Tokyo (JP)

(72) Inventor: Yasunao Onda, Tokyo (JP)

(73) Assignee: GAP CO., LTD., Tokyo (JP)

( * ) Notice: Subject to any disclaimer, the term of this patent is extended or adjusted under 35 U.S.C. 154(b) by 144 days.

(21) Appl. No.: 18/738,280

(22) Filed: Jun. 10, 2024

(65) Prior Publication Data

US 2024/0330588 A1 Oct. 3, 2024

Related U.S. Application Data

(63) Continuation of application No. PCT/JP2021/045888, filed on Dec. 13, 2021.

(51) Int. Cl.
*G06F 40/268* (2020.01)
*G06F 16/33* (2025.01)
(Continued)

(52) U.S. Cl.
CPC ............ *G06F 40/268* (2020.01); *G06F 16/33* (2019.01); *G06F 16/34* (2019.01); *G06F 40/151* (2020.01);
(Continued)

(58) Field of Classification Search
CPC ........ G06F 40/268; G06F 16/33; G06F 16/34; G06F 40/284; G06F 40/166; G06F 40/242; G06F 40/51; G06F 40/151
See application file for complete search history.

(56) References Cited

U.S. PATENT DOCUMENTS

| | | | | |
|---|---|---|---|---|
| 7,984,029 | B2 * | 7/2011 | Alspector | G06F 16/1748 707/730 |
| 8,015,162 | B2 * | 9/2011 | Henzinger | G06F 16/958 726/32 |

(Continued)

FOREIGN PATENT DOCUMENTS

| | | | |
|---|---|---|---|
| CN | 102360372 | A | 2/2012 |
| CN | 113641783 | A | 11/2021 |

(Continued)

OTHER PUBLICATIONS

Qurashi, Abdul Wahab, Violeta Holmes, and Anju P. Johnson, "Document Processing: Methods for Semantic Text Similarity Analysis", Aug. 2020, 2020 International Conference on Innovations in Intelligent Systems and Applications (INISTA), pp. 1-6. (Year: 2020).*

(Continued)

*Primary Examiner* — James Boggs
(74) *Attorney, Agent, or Firm* — Myers Wolin, LLC

(57) ABSTRACT

A non-transitory storage medium storing a program causes a computer to convert a first document into a document segmented into morphemes and to delete overlapping morphemes to generate a first summary, to convert a second document determined to be relevant to the first document into a document segmented into morphemes and to delete overlapping morphemes to generate a second summary. The program causes the computer to count the number of matching morphemes between the first summary obtained by deleting the overlapping morphemes from the morphemes of the first document and the second summary obtained by deleting the overlapping morphemes from the morphemes of the second document, to determine relevance between the first document and the second document on the basis of a result of the counting processing and to extract part or all of (Continued)

the second document for which the relevance to the first document satisfies a predetermined condition.

9 Claims, 12 Drawing Sheets

(51) Int. Cl.

| | |
|---|---|
| ***G06F 16/34*** | (2025.01) |
| ***G06F 40/151*** | (2020.01) |
| ***G06F 40/166*** | (2020.01) |
| ***G06F 40/242*** | (2020.01) |
| ***G06F 40/284*** | (2020.01) |
| ***G06F 40/51*** | (2020.01) |

(52) U.S. Cl.

CPC .......... *G06F 40/166* (2020.01); *G06F 40/242* (2020.01); *G06F 40/284* (2020.01); *G06F 40/51* (2020.01)

(56) References Cited

U.S. PATENT DOCUMENTS

| | | | | |
|---|---|---|---|---|
| 8,346,536 | B2 * | 1/2013 | Jiang | G06F 16/3337 704/277 |
| 9,811,726 | B2 * | 11/2017 | Atroshchenko | G06F 40/263 |
| 10,572,544 | B1 | 2/2020 | Zhang et al. | |
| 11,537,795 | B2 * | 12/2022 | Uchida | G06F 40/268 |
| 11,658,824 | B2 * | 5/2023 | Shrinivasan | H04L 9/0861 713/164 |
| 11,734,364 | B2 * | 8/2023 | Zhang | G06F 16/93 707/730 |
| 11,829,719 | B2 * | 11/2023 | Sunaga | G06F 16/35 |
| 12,164,549 | B2 * | 12/2024 | Morimoto | G06F 40/284 |
| 2005/0060643 | A1 * | 3/2005 | Glass | H04L 51/212 715/205 |

FOREIGN PATENT DOCUMENTS

| | | | | |
|---|---|---|---|---|
| JP | 2000-242650 | A | | 9/2000 |
| JP | 2004171220 | A | * | 6/2004 |
| JP | 2004-272352 | A | | 9/2004 |
| JP | 2014-106665 | A | | 6/2014 |
| JP | 2015-203961 | A | | 11/2015 |
| JP | 2019-109654 | A | | 7/2019 |
| JP | 2019-219724 | A | | 12/2019 |

OTHER PUBLICATIONS

Yanase et al., "Sentence Ordering for Opinion Generation of Debate in terms of Distributed Representations", The Japanese Society for Artificial Intelligence Study Group DOCMAS: Special Interest Group on Data Oriented Constructive Mining and Simulation DOCMAS-007, Nov. 2014, with an English abstract.

International Search Report issued by the Japan Patent Office for corresponding International Patent Application No. PCT/JP2021/045888, mailed on Feb. 22, 2022, with an English translation.

* cited by examiner

Fig. 8

■ENCODED LANGUAGES OF EXTRACTION TARGET CONTEXT

ONI | TEISHUTSU | SURU | BA | YOI | DESU | ...
RU | GO | ITADAKU | KOTO | TO | NARU | MASU | 。 | 8 | ...
| OKONAU | TAI | GA | NOFU | ONLINE | ...
| HOJU | KENRI | SONZOKU | 4 | 10 | SOREZORE | NAO | NAI | ...
| DOITSU | SAIDO | HITSUYO | ARU | IRU | TARI | FUKUSU | DOJI | ...
RAN | MEI | ○ | KISAI | SONO | SHITA | GYO | HYOJI | MOUKERU | ...
| UKERU | ATARU | 30 | IKO | ICHIDO | OYOBI | MITOMERU | ...

■THE FOLLOWING IS ORIGINAL TEXT BEFORE LANGUAGES OF EXTRACTION TARGET CONTEXT ARE ENCODED

[data00000964.txt][3/21]

ONI TEISHUTSUSUREBA YOIDESUKA? (HOW SHOULD WE SUBMIT?) ...

NON-TRANSITORY STORAGE MEDIUM STORING DOCUMENT EXTRACTION PROGRAM IN COMPUTER LANGUAGE PROCESSING, SEMANTICALLY SIMILAR DOCUMENT EXTRACTION METHOD, AND LANGUAGE PROCESSING APPARATUS

CROSS-REFERENCE TO THE RELATED APPLICATION

This application is a continuation application of International Application PCT/JP2021/045888 filed on Dec. 13, 2021, and designated the U.S., the entire contents of which are incorporated herein by reference.

BACKGROUND

Technical Field

The present disclosure relates to a non-transitory storage medium storing a program for extracting a semantically similar document in language-related processing in computer language processing, a document extraction method, and a language processing apparatus.

Description of the Related Art

A service of setting a keyword (valid vocabulary=word and consecutive vocabularies) or a text (commonly used text) designated by a user and searching for a keyword or a text related to the set keyword or text, is provided.

For example, a similar text extraction apparatus disclosed in Patent document 1 performs word segmentation for each of a plurality of target texts and generates word vectors. Further, this similar text extraction apparatus generates sentence vectors representing features of the target texts on the basis of the word vectors. Still further, the similar text extraction apparatus extracts target texts similar to each other from the plurality of target texts on the basis of the sentence vectors.

CITATION LIST

Patent Document

[Patent Document 1]
Japanese Patent Laid-Open No. 2019-109654

SUMMARY

According to Patent document 1, the similar text extraction apparatus segments a target text into words. This similar text extraction apparatus determines parts of speech such as noun, verb, adjective, adjective verb, auxiliary verb and particle for each of the segmented words. Further, the similar text extraction apparatus excludes functional expressions such as particle from the segmented words to generate word vectors. The similar text extraction apparatus generates sentence vectors on the basis of the word vectors. The similar text extraction apparatus calculates a degree of similarity on the basis of the sentence vectors and extracts similar texts. On the other hand, in Patent document 1, the similar text extraction apparatus excludes functional expressions such as particle, and thus, there can be a case where a document desired by a user cannot be extracted. The present disclosure is directed to providing a non-transitory storage medium, and the like, storing a program for easily extracting a semantically similar text (document) with higher accuracy than related art.

One aspect of an embodiment of the present disclosure is exemplified by a non-transitory storage medium storing a program for causing a computer to execute processing.

The non-transitory storage medium storing the present program may cause a computer:

first conversion processing to convert a first document into a document segmented into morphemes on the basis of a dictionary to be used in morphological analysis and to delete overlapping morphemes to generate a first summary, second conversion processing to convert a second document determined to be relevant to the first document into a document segmented into morphemes on the basis of the dictionary to be used in the morphological analysis and to delete overlapping morphemes to generate a second summary, counting processing to count a number of matching morphemes between the first summary obtained by deleting the overlapping morphemes from the morphemes of the first document and the second summary obtained by deleting the overlapping morphemes from the morphemes of the second document, and extraction processing to determine relevance between the first document and the second document on the basis of a result of the counting processing and to extract part or all of the second document for which the relevance to the first document satisfies a predetermined condition.

As described above, the present disclosure can provide a non-transitory storage medium, and the like, storing a program for easily extracting a document similar to a document desired by a user.

BRIEF DESCRIPTION OF THE DRAWINGS

FIG. 8 is an example of processing of extracting a document in the embodiment of the present disclosure.

DESCRIPTION OF THE EMBODIMENT

A non-transitory storage medium storing a document extraction program in one embodiment (also referred to as an embodiment) of the present disclosure, a document extraction method and a language processing apparatus will be described below on the basis of the drawings.

Embodiment

An embodiment will be described using FIGS. 1 to 8.

Figure 1:
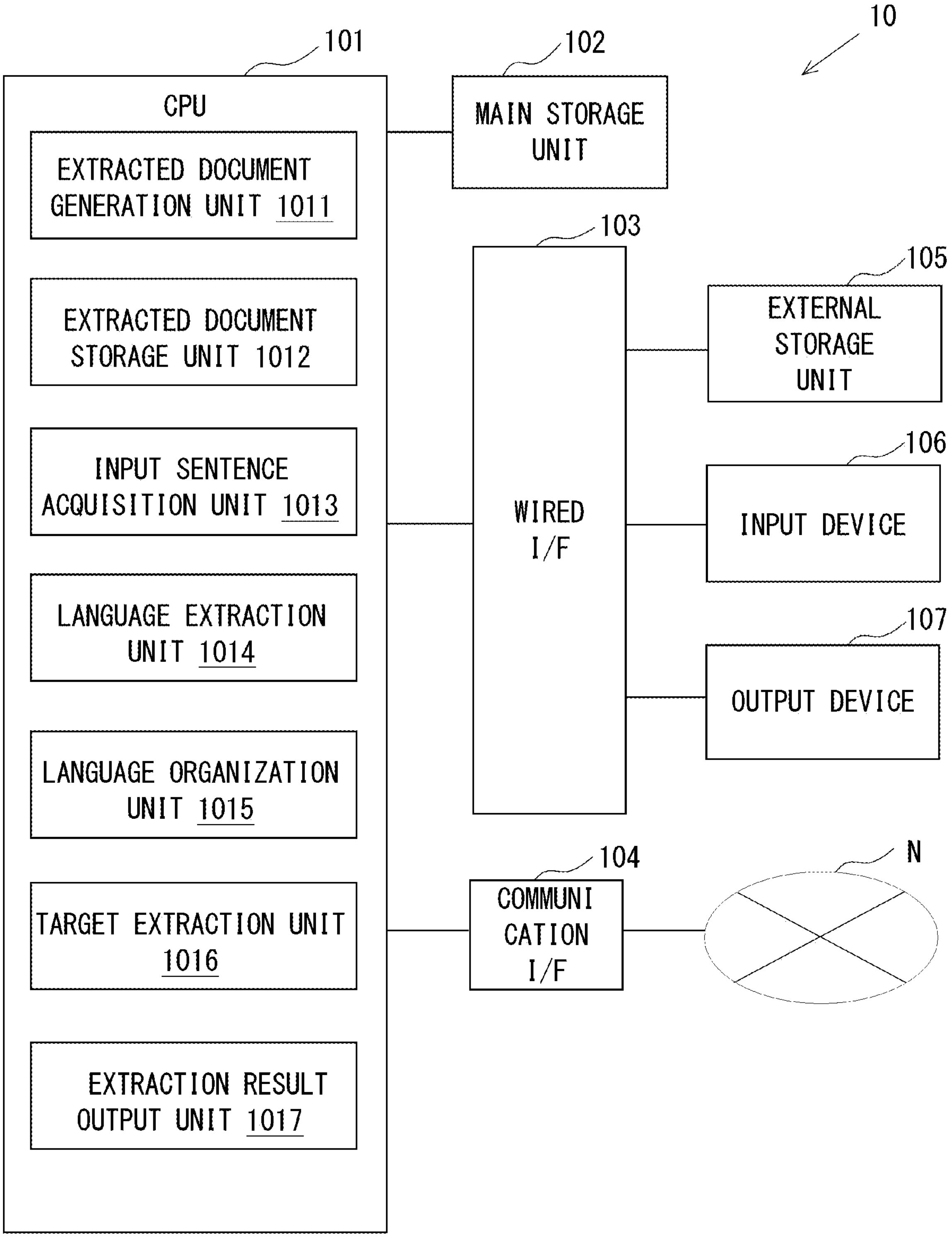
FIG. 1 is a block diagram of a language processing apparatus according to the present disclosure.

FIG. 1 is a block diagram illustrating an example of a hardware configuration of a language processing apparatus in the present embodiment. A language processing apparatus 10 includes a central processing unit (CPU) 101, a main storage unit 102, and input/output parts connected through various kinds of interfaces. The CPU 101 executes information processing by a program stored in the main storage unit 102.

The language processing apparatus 10 includes, for example, a wired interface (hereinafter, referred to as a wired I/F) 103, a communication interface (hereinafter, referred to as a communication I/F) 104, an external storage unit 105, an input device 106 and an output device 107. Here, the language processing apparatus 10 is, for example, electronic equipment called a personal computer, a smartphone or a mobile information terminal.

The CPU 101 includes an extracted document generation unit 1011, an extracted document storage unit 1012, an input sentence acquisition unit 1013, a language extraction unit 1014, a language organization unit 1015, a target extraction unit 1016 and an extraction result output unit 1017. The CPU 101 executes a computer program loaded to the main storage unit 102 so as to be executable and provides functions of the language processing apparatus 10. The CPU 101 may be a multicore or may include a dedicated processor that executes signal processing, and the like. The CPU 101 may include a dedicated hardware circuit that executes signal processing, product-sum operation, vector operation and other processing. The configuration in FIG. 1 is an example of the CPU 101. In the embodiment, the language processing apparatus 10 is not limited to the configuration in FIG. 1. For example, an external language processing apparatus, or the like, may include one of the extracted document generation unit 1011, the extracted document storage unit 1012, the input sentence acquisition unit 1013, the language extraction unit 1014, the language organization unit 1015, the target extraction unit 1016 and the extraction result output unit 1017, and the CPU 101 may be connected to them via the wired I/F 103, the communication I/F 104 or a wireless I/F. Even if one of the extracted document generation unit 1011, the extracted document storage unit 1012, the input sentence acquisition unit 1013, the language extraction unit 1014, the language organization unit 1015, the target extraction unit 1016 and the extraction result output unit 1017 is connected to the CPU 101 via the wired I/F 103, the communication I/F 104 or the wireless I/F, the CPU 101 can perform processing described as an example in the embodiment.

The CPU 101 is one type of a control circuit. Various kinds of processors such as a micro processing unit (MPU) and a graphics processing unit (GPU) may be used in place of the CPU 101. The CPU 101 includes a function of controlling the entire language processing apparatus 10.

The CPU 101 provides an extraction result of the document desired by the user, to the output device 107 by executing a predetermined application stored in the main storage unit 102 provided in the language processing apparatus 10 or the external storage unit 105 connected by way of the wired I/F 103. This allows the CPU 101 to cause the input device 106 to perform operation for extracting the document desired by the user.

The main storage unit 102 stores a computer program to be executed by the CPU 101, data to be processed by the CPU 101, and the like. The main storage unit 102 includes a volatile storage device such as a read only memory (ROM) and a random access memory (RAM) and temporarily stores a program to be used by the CPU 101 and data for control such as operation parameters. The main storage unit 102 includes, for example, a main memory and a read only memory. The main storage unit 102 further includes a dynamic random access memory (DRAM) and a high-speed cache memory. When processing data is stored in the main storage unit 102 during operation and use, the main storage unit 102 stores at least part of commands for execution by the CPU 101.

The language processing apparatus 10 may include the external storage unit 105 in addition to the main storage unit 102. The external storage unit 105 is, for example, used as a storage area that assists the main storage unit 102 and stores a computer program to be executed by the CPU 101, data to be processed by the CPU 101, and the like. The external storage unit 105 includes a non-volatile storage device such as a flash memory, a disk drive exemplified by a hard disk drive (HDD). A user authentication program, a document extraction program including data regarding various kinds of images and objects, and the like, are stored. In the external storage unit 105, a database including a table for managing various kinds of data may be further constructed.

The wired I/F 103 transmits information between the CPU 101, and the external storage unit 105, the input device 106 and the output device 107. The information to be transmitted is information such as, for example, a computer program to be executed by the CPU 101 and data to be processed by the CPU 101. The wired I/F 103 includes various kinds of connection terminals such as a universal serial bus (USB) terminal, a digital visual interface (DVI) terminal and a high-definition multimedia interface (HDMI) (registered trademark) terminal and connects the CPU 101 and the external storage unit 105, and the like. The interface is not limited to this, and a wireless I/F may connect the CPU 101 and one or all of the external storage unit 105, the input device 106 and the output device 107 instead of the wired I/F 103. The wireless I/F is, for example, Bluetooth low energy (BLE) (registered trademark), a wireless LAN, or the like.

The configuration in FIG. 1 is an example of the language processing apparatus 10, and in the embodiment, the configuration of the language processing apparatus 10 is not limited to the configuration in FIG. 1. Even if one of the external storage unit 105, the input device 106 and the output device 107 is connected to the CPU 101 via the wireless I/F, the CPU 101 can perform processing described as an example in the embodiment.

The communication I/F 104 transmits/receives data to/from other devices via a network N. The communication I/F 104 is, for example, a communication device on a terminal side that is connectable to a base station of a mobile telephone network. The communication I/F 104 may include an interface to a wireless local area network (LAN), and an interface to Bluetooth (registered trademark) and Bluetooth low energy (BLE) (registered trademark).

The input device 106 is an operation device to be used by the user to perform input operation. Specifically, a pointing device such as a mouse, a keyboard, and the like, are used as the input device 106. Further, a touch panel superimposed on a display screen of the output device 107 may be used as the input device 106.

The output device 107 is, for example, a liquid crystal display, an electro luminescence panel, or the like. The output device 107 displays an electronic document to be processed by control by the CPU 101. Further, the output device 107 displays a result of processing performed by the CPU 101. The output device 107 may be formed by a processor dedicated for signal processing and a program stored in a memory, or the like. The output device 107 may include a dedicated hardware circuit. However, processing in the embodiment which will be described later may be executed by other language processing apparatuses on the network N. In this case, the input device 106 provides a result of language processing to the user in cooperation with the other language processing apparatuses.

The extracted document generation unit 1011 acquires a document to be extracted (hereinafter, referred to as a second document) from web content, document files, and the like, to create a document file. In the present embodiment, the language processing apparatus 10 extracts part or all of documents including a term designated by the user or part or all of documents similar to a document designated by the user from the document to be extracted. Here, the document including the term designated by the user or the document designated by the user is so-called data that becomes a source of extraction and will be referred to as a first document. Further, the document to be extracted will be referred to as the second document.

In the present embodiment, it is assumed that a "language" indicates a segment obtained by segmenting a document in units of morpheme on the basis of a dictionary to be used in morphological analysis. A context refers to a collection of "languages" obtained by deleting overlapping of morphemes and organizing the morphemes so as to include one word for each morpheme. In other words, the context is an example of a summary formed by acquiring words one by one from a document and leaving words that do not overlap with each other. The present analysis processing may be performed by a morphological analyzer using a morphological analysis dictionary. The morphological analyzer is a tool including a function of separating words in Japanese with spaces and specifying parts of speech. Here, the tool is a program which is to be utilized on a computer and which is started from another program to provide a function. However, even in a case where the same morpheme is acquired from a document a plurality of times, the extracted document generation unit 1011 includes only one morpheme in the context. In short, in the present embodiment, the context refers to a collection of morphemes which are included in the first document and which are obtained by removing overlapping morphemes. Then, the extracted document generation unit 1011 creates extracted document information for making symbols conform to each other between languages on the basis of the document file created as the collection of the "languages" from which the overlapping morphemes are eliminated. As an example, the extracted document information includes three pieces of language data, target information and extraction index data.

The language data is data obtained by segmenting the second document to be extracted, acquired by the extracted document generation unit 1011 in units of morpheme using the morphological analyzer, or the like, that is, converting the second document into languages.

The target information is a target ID uniquely assigned for each file of the acquired second document, a document file name and a storage destination. The target information is used in processing of displaying information related to the second document when the extraction result output unit 1017 presents an extraction result of the document to the user.

The extraction index data is data of pair information between languages and target IDs related to document portions of the second document including the languages, that is, the language data. A pair in the extraction index data includes a configuration in which one language corresponds to one or a plurality of target IDs. The extraction index data is used in processing of counting the number of matching languages between the languages related to the first document and the languages related to the document portion of the second document at the target extraction unit 1016 which will be described later. The languages related to the first document are a collection of languages obtained by deleting overlapping morphemes and organizing the morphemes so as to include one word for each morpheme. The document portion of the second document is a collection of the languages obtained by deleting overlapping morphemes in units of page and organizing the morphemes so as to include one word for each morpheme.

The extracted document storage unit 1012 stores the extracted document information generated in the extracted document generation unit 1011. Storage is performed by recording in the main storage unit 102 or the external storage unit 105. The extracted document generation unit 1011 and the extracted document storage unit 1012 may be different apparatuses separate from the language processing apparatus 10.

The input sentence acquisition unit 1013 acquires the first document input to the input device 106 by the user. Examples of input operation by the user can include keyboard operation of a personal computer, and operation on a touch panel display. However, the input operation is not limited to the above-described operation, and the first document may be input using a speech, and the like. Note that it is assumed in the present embodiment that the first document input to the input device 106 is a document input in Japanese. Processing in a case where the first document is input in language other than Japanese will be described later in a modification.

The language extraction unit 1014 accepts the first document acquired at the input sentence acquisition unit 1013 and outputs a context that is a collection of languages segmented in units of morpheme on the basis of the dictionary of morphological analysis. In a case where there is a base form of the segmented language, the language may be replaced with a language of the base form. The base form is, for example, "ugoku (move)" in a case where the language is a verb of "ugoka (nai) ((not) move)".

The language organization unit 1015 accepts contexts output at the language extraction unit 1014, deletes overlapping languages in the respective contexts, thereby organizes the contexts so as to include only one language in each context and outputs non-overlapping languages.

The target extraction unit 1016 accepts contexts related to respective document portions including non-overlapping languages organized in the language organization unit 1015. The target extraction unit 1016 acquires a document portion (language data) related to the second document corresponding to each language related to the first document with reference to extraction index data stored in the extracted document storage unit 1012. The target extraction unit 1016 counts the number of matching languages between the languages related to the context of the first document and languages of language data related to the second document regardless of the order of languages and obtains a document portion including a largest count value. The target extraction unit 1016 outputs the document portion for which the largest count value is obtained. The target extraction unit 1016 may output document portions for which the second and subsequent largest count values are obtained in addition to the largest count value. The target extraction unit 1016 may, for example, output document portions for which the largest to the N-th largest count values are obtained on the basis of designation by the user. The document portions to be output are not limited to these, and the user may be allowed to freely designate conditions for the document portions to be output at the input device 106.

The extraction result output unit 1017 accepts target IDs related to the document portions related to the second document extracted at the target extraction unit 1016. The extraction result output unit 1017 refers to target information stored in the extracted document storage unit 1012. The extraction result output unit 1017 acquires a corresponding document file name and storage destination for each of the target IDs of the document portions related to the second document in the target information and outputs the corresponding document file name and storage destination as an extraction result. The extraction result is output, for example, through display on a display device at the output device 107, recording in a storage device such as the main storage unit 102 or the external storage unit 105, transmission to an external apparatus, or the like. However, an output method of the extraction result is not limited to this.

Counting Processing of the Number of Matching Languages

Figure 2:
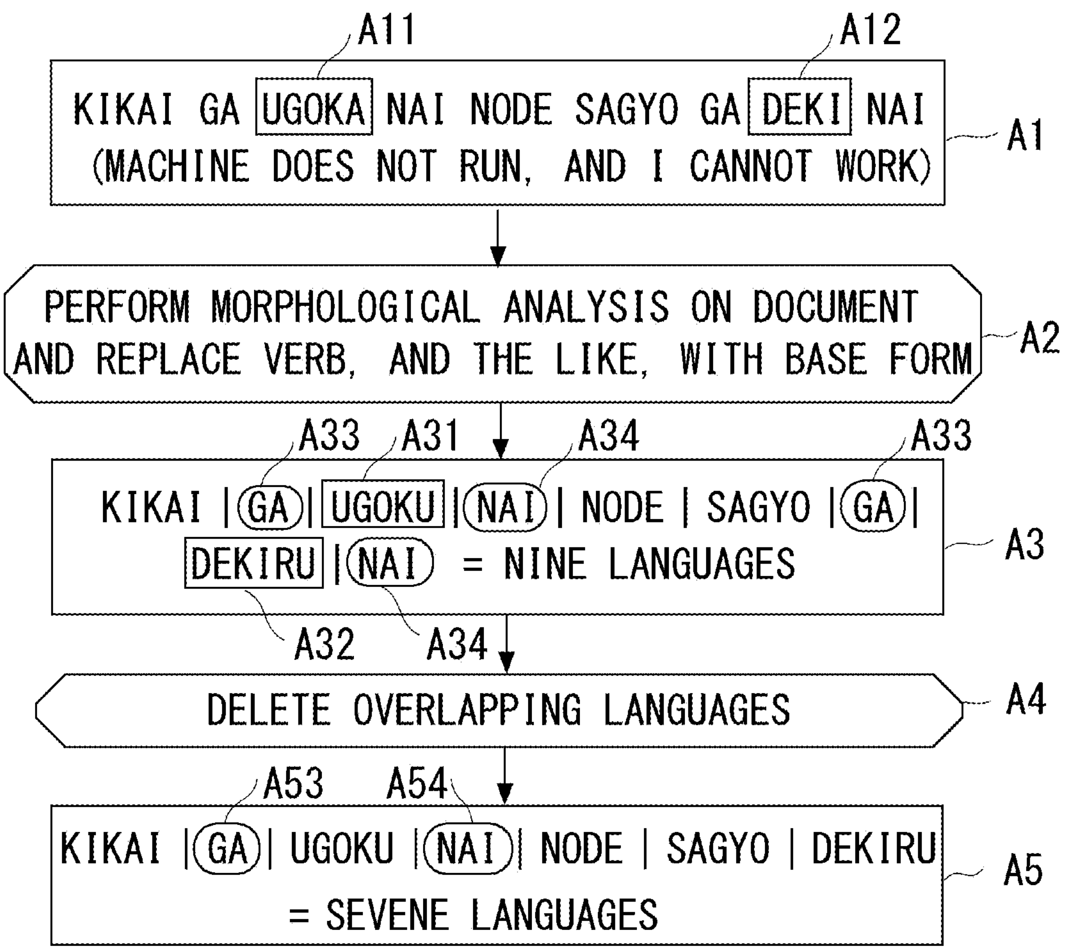
FIG. 2 is a flowchart illustrating an example of processing of converting a first document into a document segmented into morphemes and deleting overlapping morphemes in an embodiment of the present disclosure.

Processing of counting the number of matching languages between the first document and the second document determined to be relevant to the first document in the embodiment will be described next using FIGS. 2 to 4. FIG. 2 is a flowchart illustrating an example of processing of converting the first document into a document segmented into morphemes (languages) and deleting overlapping languages in the embodiment.

It is assumed that as the first document to be subjected to language processing, the user inputs a document of "kikaiga ugokanainode sagyoga dekinai (machine does not run, and I cannot work)" to the input device 106 of the language processing apparatus 10, and the input sentence acquisition unit 1013 acquires the document (step A1).

The language extraction unit 1014 of the language processing apparatus 10 accepts the document acquired by the input sentence acquisition unit 1013 and outputs respective languages segmented in units of morpheme on the basis of the dictionary of morphological analysis. For example, as illustrated in FIG. 2, in a case where the input first document is "kikaiga ugokanainode sagyoga dekinai (machine does not run, and I cannot work)", the document is segmented into nine languages of "kikai|ga|ugoka (A11)|nai|node|sagyo|ga|deki (A12)|nai (machine|does|not|run (A11)|and|I|can (A12)|not|work)" and output. Further, in the example in FIG. 2, regarding languages for which the morphemes include base forms, the morphemes in the first document are replaced with the base forms (step A2). Specifically, the morphemes of verbs of "ugoka (run)" (A11) and "deki (can)" (A12) are respectively replaced with base forms of "ugoku (run)" (A31) and "dekiru (can)" (A32). Thus, the above-described document segmented into nine languages is output to the output device 107 as a context including nine languages of "kikai|ga|ugoku|nai|node|sagyo|ga|dekiru|nai (machine|does|not|run|and|I|can|not|work)" (step A3).

The language organization unit 1015 accepts the respective languages output at the language extraction unit 1014 and deletes overlapping languages. Specifically, the context of the output languages of "kikai|ga (A33)|ugoku|nai (A34)|node|sagyo|ga (A33)|dekiru|nai (A34) (machine|does (A33)|not (A34)|run|and|I|can (A33)|not (A34)|work)" includes two "ga" (A33) and two "nai" (A34), which are overlapping languages. Thus, the language organization unit 1015 performs processing of deleting each one of "ga" (A33) and "nai" (A34) which are overlapping languages so as to include only one of them (step A4). Thus, the context output by the language organization unit 1015 includes seven languages of "kikai|ga (A53)|ugoku|nai (A54)|node|sagyo|dekiru (machine|does (A53)|not (A54)|run|and|I|can|work)" (step A5).

Figure 3:
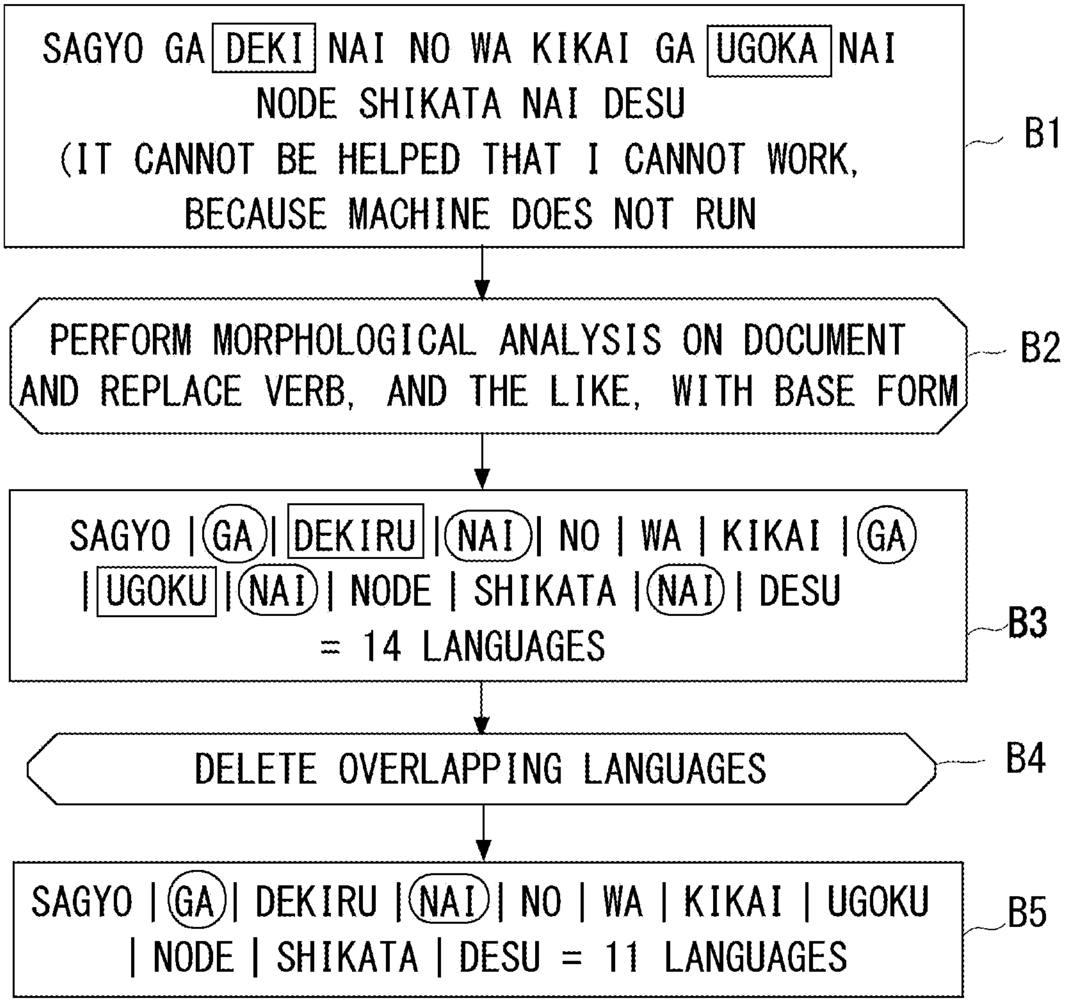
FIG. 3 is a flowchart illustrating an example of processing of converting a second document into a document segmented into morphemes and deleting overlapping morphemes in the embodiment of the present disclosure.

FIG. 3 is a flowchart illustrating an example of processing of converting the second document determined to be relevant to the first document into a document segmented into morphemes (languages) and deleting overlapping languages in the embodiment.

Extracted Document Generation Unit

It is assumed in FIG. 3 that the second document is web content, or the like. The number of languages that match respective languages included in the first document that is the first document input by the user is counted in the extraction target. In FIG. 3, the second document is a document of "sagyoga dekinainowa, kikaiga ugokanainode shikata naidesu (It cannot be helped that I cannot work, because machine does not run)" (step B1).

The extracted document generation unit 1011 accepts the above-described acquired document and outputs respective languages segmented in units of morpheme on the basis of the dictionary of morphological analysis. Thus, the acquired document of "sagyoga dekinainowa, kikaiga ugokanainode shikata naidesu (It cannot be helped that I cannot work, because machine does not run)" is segmented into 14 languages of "sagyo|ga|deki|nai|no|wa|kikai|ga|ugoka|nai|node|shikata|nai|desu (It|can|not|be|helped|that|I|can|not|work|because|machine|does|not|run)" and output. Further, in the example in FIG. 3, regarding languages for which morphemes include base forms, the input morphemes are replaced with morphemes of basic forms. Specifically, the morphemes of verbs of "ugoka (run)" and "deki (can)" include base forms and are respectively replaced with languages of "ugoku (run)" and "dekiru (can)" (step B2). Thus, the above-described document segmented into 14 languages is output as a context including 14 languages of "sagyo|ga|dekiru|nai|no|wa|kikai|ga|ugoku|nai|node|shikata|nai|desu (It|can|not|be|helped|that|I|can|not|work|because|machine|does|not|run)" (step B3). However, processing of replacing morphemes with base forms is not essential. The processing may proceed to step B3 without the processing of replacing morphemes with base forms in step B2.

The extracted document generation unit 1011 deletes overlapping languages for each of the languages segmented in units of morphemes (step B4). In the example in FIG. 3, a context related to the segmented languages "sagyo, ga, dekiru, nai, no, wa, kikai, ga, ugoku, nai, node, shikata, nai, desu (It, can, not, be, helped, that, I, can, not, work, because, machine, does, not, run)" includes two "ga" and three "nai", which are each overlapping. The extracted document generation unit 1011 performs processing of deleting one "ga" and two "nai" which are overlapping languages so as to include each one "ga" and "nai". Then, the context output by the extracted document generation unit 1011 includes 11 languages of "sagyo|ga|dekiru|nai|no|wa|kikai|ugoku|node|shikata|desu (It|can|not|be|helped|that|I|work|because|machine|run)" (step B5).

Figure 4:
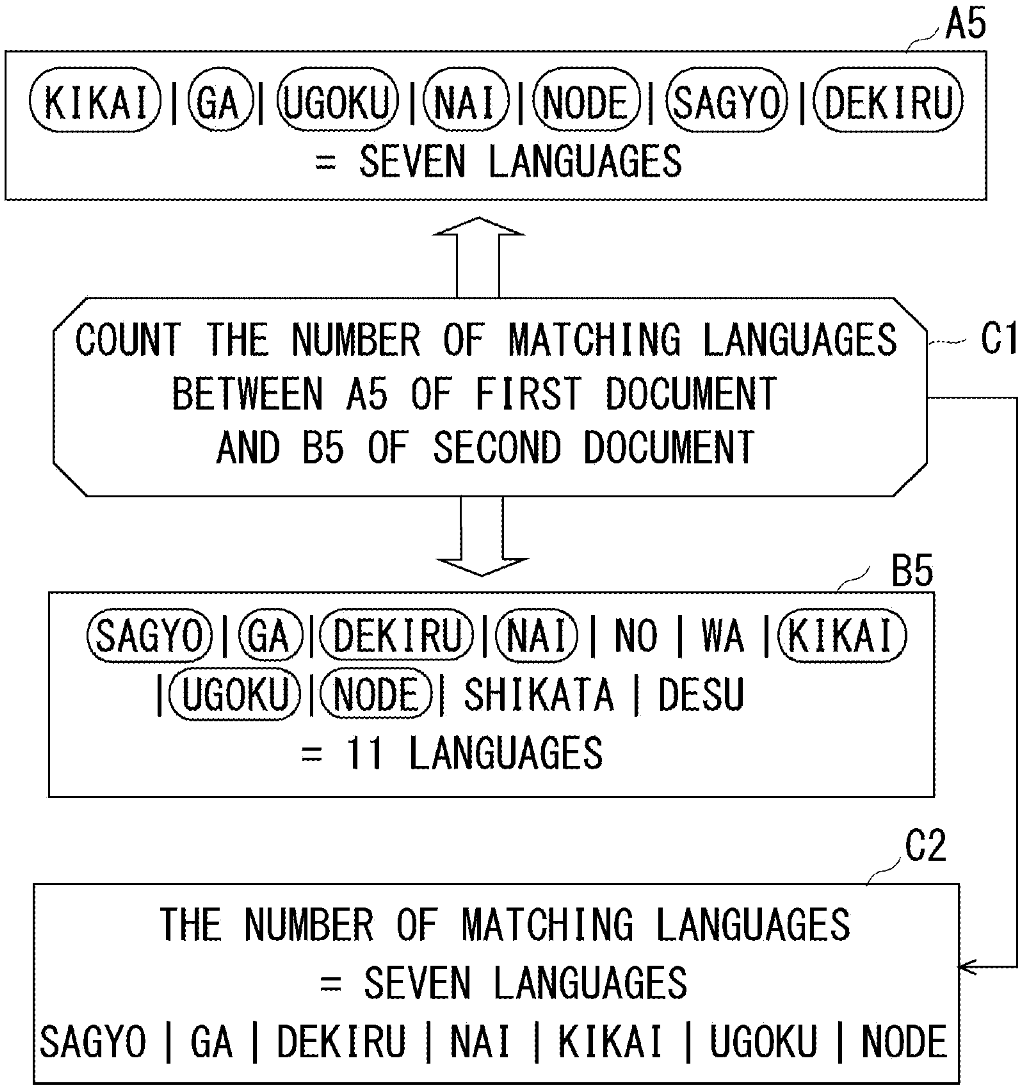
FIG. 4 is a flowchart of processing of counting the number of matching languages between the first document and the second document in the embodiment of the present disclosure.

FIG. 4 is a flowchart of processing of counting the number of matching languages between the first document and the second document determined to be relevant to the first document in the embodiment.

The languages related to the first document are seven languages of "kikai|ga|ugoku|nai|node|sagyo|dekiru (machine|does|not|run|and|I|can|work)" as described in step A5 in FIG. 2 (step A5). In contrast, the languages related to the second document are eleven languages of "sagyo|ga|dekiru|nai|no|wa|kikai|ugoku|node|shikata|desu (It|can|not|be|helped|that|I|work|because|machine|run)" as described in step B5 in FIG. 3. The target extraction unit 1016 compares the above-described seven languages and 11 languages and counts the number of matching languages (step C1). Upon counting, determination based on meaning of each language is not performed. Only characters of each language are compared to determine whether or not the languages related to the first document match the languages related to the second document. In the example in FIG. 4, both the language of "kikai (machine)" related to the first document and the language of "kikai (machine)" related to the second document include characters of "ki" and "kai". Thus, the target extraction unit 1016 determines that the both languages match. The target extraction unit 1016 performs processing of counting the number of matching languages for all the languages related to the first document and the languages related to the second document using a similar method. The target extraction unit 1016 determines (counts) that the number of matching languages is seven of "sagyo|ga|dekiru|nai|kikai|ugoku|node (I|work|can|not|machine|run|because)" (step C2). As described above, the target extraction unit 1016 determines only whether or not each language matches as characters and does not determine in consideration of meaning of each language. In other words, a collection of languages obtained by deleting overlapping morphemes and organizing the morphemes so as to include one word for each morpheme becomes a result constituting semantic similarity of the context. However, the CPU 101 of the language processing apparatus 10 may perform determination processing in consideration of meaning of each language.

Processing of Extracted Document Generation Unit

Figure 5:
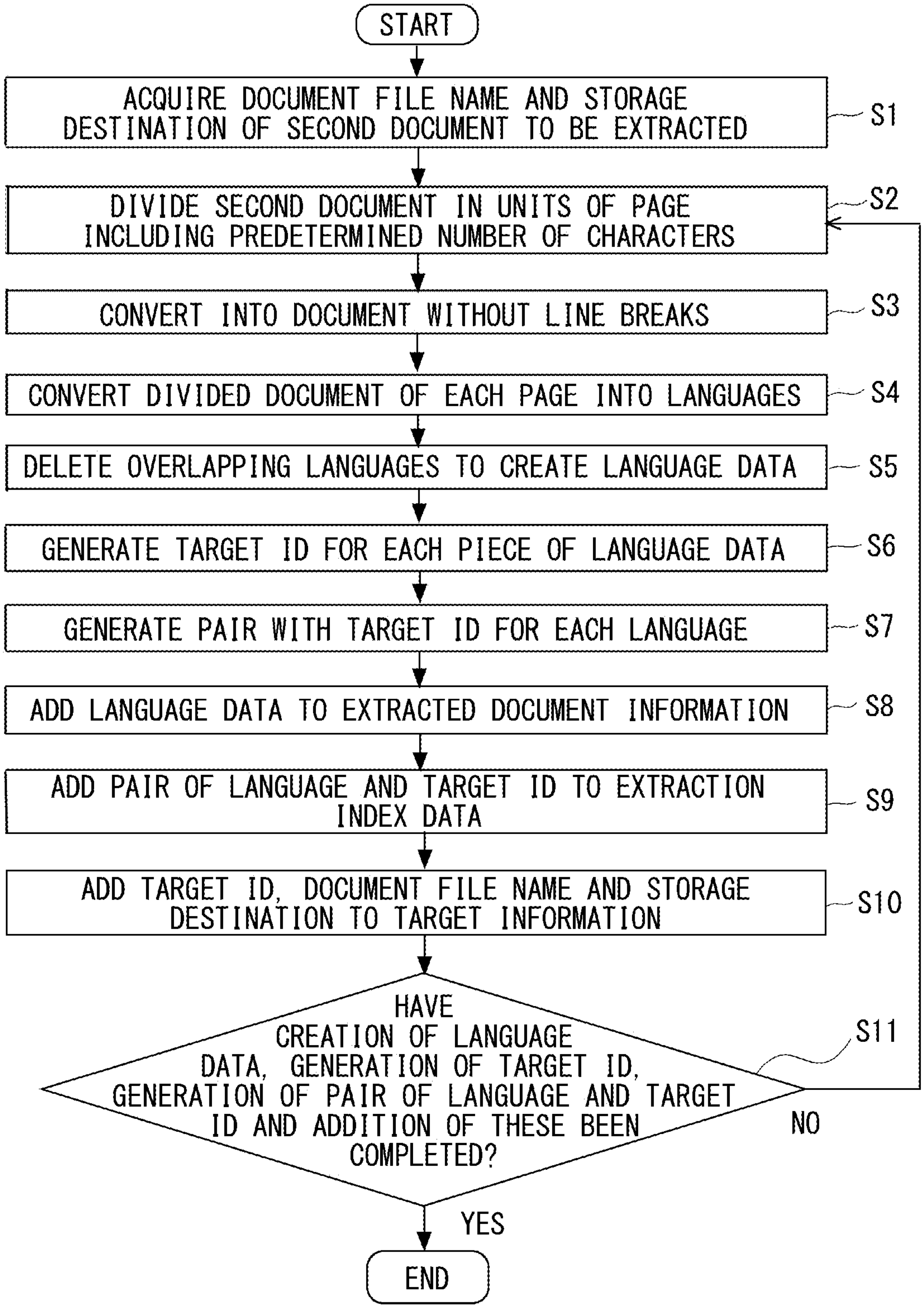
FIG. 5 is a flowchart illustrating an example of processing of an extracted document generation unit in the embodiment of the present disclosure.

An example of processing flow by the extracted document generation unit 1011 of the CPU 101 according to the language processing apparatus 10 in the embodiment will be described using FIG. 5.

The extracted document generation unit 1011 acquires a document file name and a storage destination of the second document to be extracted from web content, document files, or the like (step S1). The second document to be extracted is, for example, designated by input from the user.

The extracted document generation unit 1011 divides the second document into documents in units of page including a predetermined number of characters to create document portions (step S2). The predetermined number of characters may be set in advance at the language processing apparatus 10, or the user may be allowed to designate a desired number of characters by inputting the number to the input device 106.

The extracted document generation unit 1011 converts each of the divided document portions described above into documents without line breaks (step S3). When the second document includes a line break, the extracted document generation unit 1011 does not recognize characters before and after the line break as a series of morphemes upon morphological analysis which will be described later and recognizes the characters as respective morphemes and can perform morphological analysis for each of the morphemes. The conversion is performed to prevent a situation where appropriate morphological analysis (conversion processing to be performed on languages segmented into morphemes) is not performed for a morpheme which is originally a series of morphemes. However, the present line break processing is not essential. The processing may proceed to step S4 without the line break processing being performed.

The extracted document generation unit 1011 converts the above-described document converted into the document without line breaks into a document including languages segmented into morphemes on the basis of the dictionary to be used in morphological analysis to create language data. In a case where parts of speech related to respective languages include base forms, processing of replacing the languages segmented into morphemes with the base forms may be performed (step S4).

The extracted document generation unit 1011 determines whether or not there is an overlapping language for each of the languages of the above-described language data segmented into morphemes. In a case where there is an overlapping language, processing of deleting the overlapping language so that the language data includes only one language for each language is performed (step S5). The processing of deleting an overlapping language is not essential. The processing may proceed to step S6 without the deletion processing being performed.

The extracted document generation unit 1011 generates a target ID for each piece of the language data of the document portions related to the divided pages (step S6).

The extracted document generation unit 1011 generates a pair with a corresponding target ID for each language of the language data (step S7).

The extracted document generation unit 1011 adds the language data to the extracted document information (step S8). Addition of the pair may be performed through storage in one of the main storage unit 102 or the external storage unit 105.

The extracted document generation unit 1011 adds pair information of the target ID corresponding to each language to the extraction index data (step S9). Addition of the pair information may be performed through storage in one of the main storage unit 102 or the external storage unit 105.

The extracted document generation unit 1011 adds target information (target ID, a document file name and a storage destination) to the extracted document information (step S10). Addition of the target information may be performed through storage in one of the main storage unit 102 or the external storage unit 105.

The extracted document generation unit 1011 determines whether or not processing of converting a document into languages, generating a target ID for each divided page, and adding the target information to the extracted document information has been completed (step S11). When the processing has been completed, the processing of the extracted document generation unit 1011 is completed (step S11: Yes), and when the processing has not been completed (step S11: No), the processing returns to step S2.

Overall Processing of Language Processing Apparatus

Figure 6:
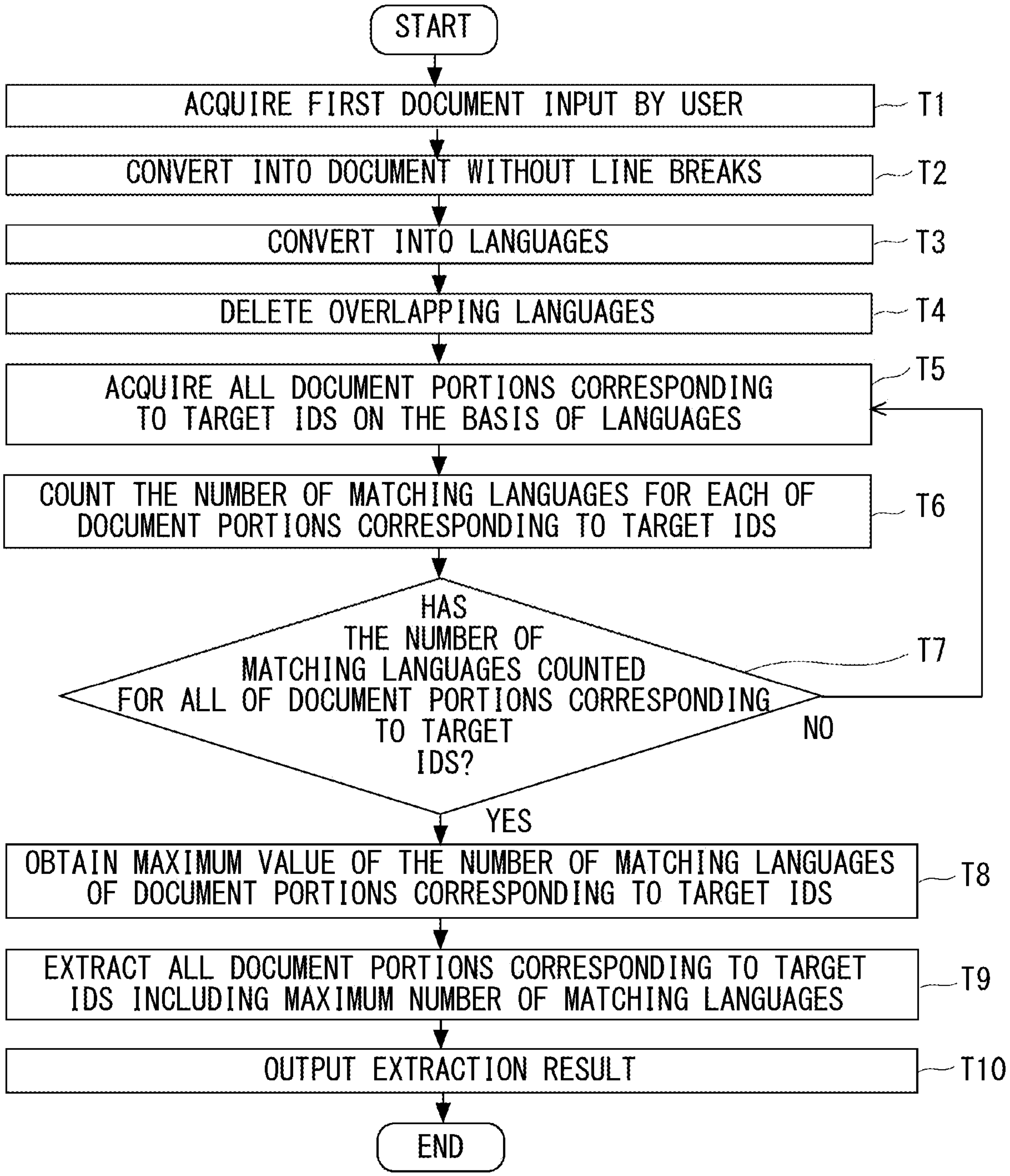
FIG. 6 is a flowchart illustrating an example of processing of the language processing apparatus in the embodiment of the present disclosure.

An example of overall processing flow by the CPU 101 of the language processing apparatus 10 in the embodiment will be described using FIG. 6.

The input sentence acquisition unit 1013 acquires from the input device 106, a document which is input to the input device 106 by the user and which includes a term that the user desires to extract (step T1). The document including a term that is desired to be extracted is a document that becomes a source of extraction and can be said as an example of the first document.

The language extraction unit 1014 converts the first document into a document without line breaks to avoid language segmentation by a line break (step T2). However, the present line break processing is not essential. The processing may proceed to step T3 without the line break processing being performed.

The language extraction unit 1014 converts the document converted into the above-described document without line breaks into a document including languages segmented in units of morpheme on the basis of the dictionary of morphological analysis (step T3). In a case where parts of speech related to respective languages include base forms, processing of replacing the languages segmented into the morphemes with the base forms may be performed.

The language organization unit 1015 determines whether or not there is an overlapping language for each of the languages segmented into the above-described morphemes, and in a case where there is an overlapping language, deletes the overlapping language so that only one language is included for each language (step T4). The processing of deleting an overlapping language is not essential. The processing may proceed to step T5 without the deletion processing being performed.

The target extraction unit 1016 acquires document portions corresponding to target IDs of the second document on the basis of respective languages of the first document (step T5).

The target extraction unit 1016 compares the languages related to the first document and the languages included in the respective document portions corresponding to the target IDs of the second document to count the number of matching languages (step T6).

The target extraction unit 1016 determines whether or not the number of matching languages with the first document has been counted for all the document portions corresponding to the target IDs of the second document determined to be relevant to the first document (step T7). When counting has been completed for all the document portions (step T7: Yes), the processing proceeds to step T8, and when counting has not been completed (step T7: No), the processing returns to step T5.

The target extraction unit 1016 obtains a maximum value of the number of matching languages between the languages related to the first document and the languages included in the document portions corresponding to the target IDs of the second document (step T8).

The extraction result output unit 1017 extracts a document portion corresponding to a target ID with the maximum number of matching languages (step T9). The extraction processing may be performed for part of the document portion corresponding to the target ID with the maximum number of matching languages or may be performed for all of the corresponding document portions.

The extraction result output unit 1017 outputs an extraction result of the document portion corresponding to the target ID with the maximum number of matching languages to the output device 107, and the processing ends (step T10).

Example of Document Extraction Processing by Language Processing Apparatus

An example of processing of extracting a document using the language processing apparatus 10 in the embodiment will be described using FIGS. 7 and 8. In the following processing example, document data for verification is acquired from documents existing in the home page (HP) of the Japan Patent Office and used as the second document to be extracted. In a case where a file of one document exceeds 1,000 characters among the acquired document data, the file of the document is divided in units of page (document portion) each including 1,000 characters. Extracted document information regarding processing of determining relevance to the first document is generated for this document portion.

Example 1

Figure 7:
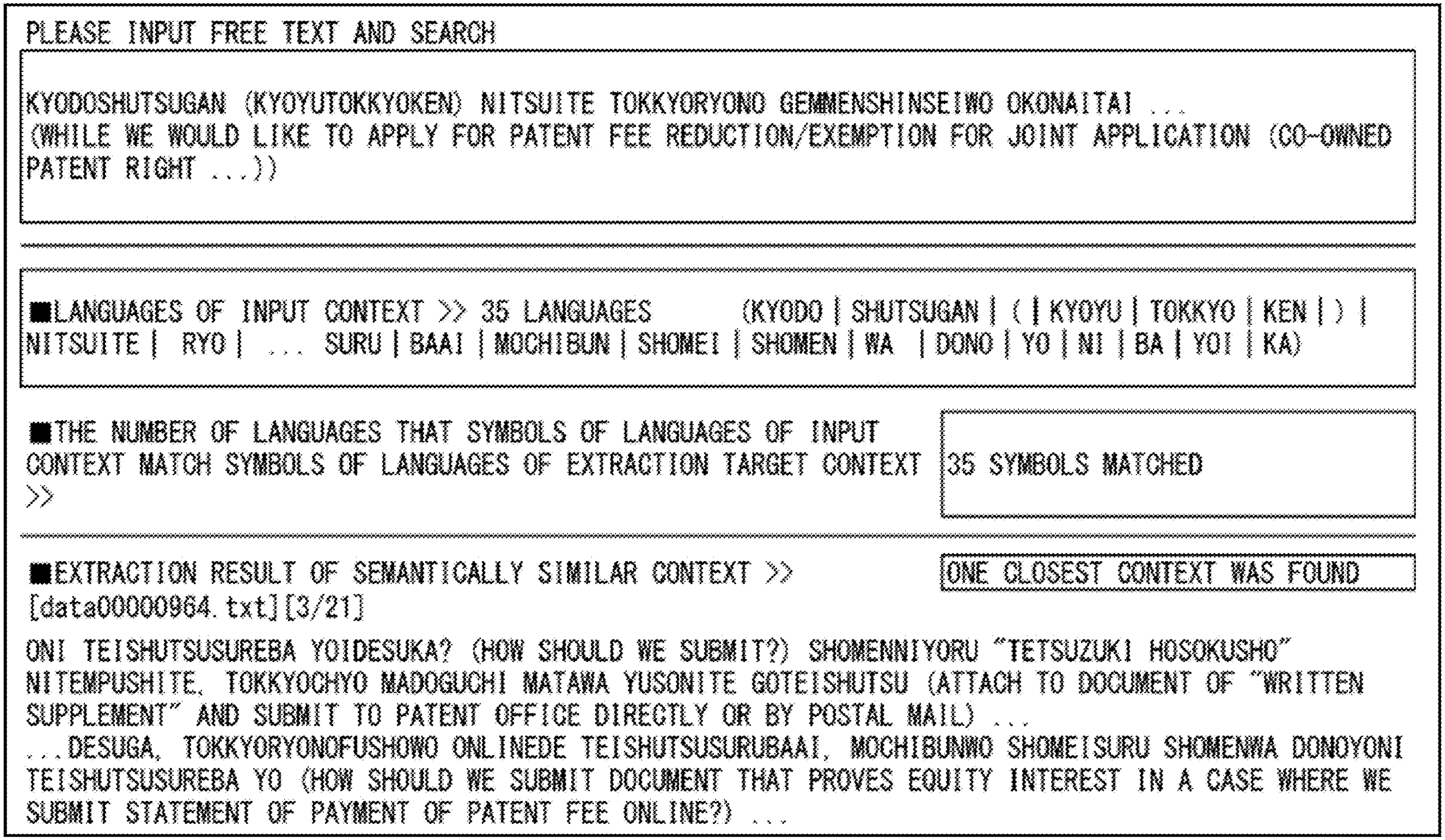
FIG. 7 is an example of processing of extracting a document in the embodiment of the present disclosure.

FIGS. 7 and 8 are examples of processing of extracting a document desired by the user as the first document including a long text (hereinafter, referred to as a long text) in the embodiment of the present disclosure. FIG. 7 illustrates a left portion of a screen to be displayed as an extraction result of the document after the first document is input to a search field of the input device 106 and search is performed. FIG. 8 illustrates a left portion of a screen (details of the extracted document) to be displayed as a window different from the screen in FIG. 7 in a case where the document displayed as the extraction result is depressed on the screen in FIG. 7. In other words, FIGS. 7 and 8 are screens indicating the extraction result of the document based on search using the first document. The reason why the figure is separated into FIGS. 7 and 8 is that the above-described extraction result is displayed with a plurality of items, and it is difficult to illustrate them in one figure. Further, by fragmentarily illustrating the items of the extraction result separately in FIGS. 7 and 8, points important in description of the embodiment which will be described later, can be illustrated in close-up, which makes it easier to understand the present disclosure.

In the example in FIG. 7, extraction processing of a document by the CPU 101 is verified assuming that a text obtained by copying part from a body text on the HP of the Japan Patent Office is a long text. The long text in the present example is "kyodoshutsugan (kyoyutokkyoken) nitsuite tokkyoryono gemmenshinseiwo okonaitainodesuga, tokkyoryonofushowo onlinede teishutsusurubaai, mochibunwo shomeisuru shomenwa donoyoni teishutsusureba yoidesuka (while we would like to apply for patent fee reduction/exemption for joint application (co-owned patent right), how should we submit a document that proves equity interest in a case where we submit a statement of payment of the patent fee online?)". The user inputs the long text in the search field of the input device 106 in the language processing apparatus 10 and depresses the search button (one step). In a case where depression of the search button is detected, the long text is converted into languages segmented in units of morpheme by the language extraction unit 1014 of the CPU

101. In a case where parts of speech related to respective languages include base forms, the languages are converted into the base forms. In a case where there are overlapping languages, the overlapping of the languages is deleted, and the languages are organized to include only one language for each language. Then, a context that is a collection of languages is output. In a case of the long text, a context segmented into "kyodo|shutsugan|(|kyoyu|tokkyo|ken|)|nitsuite|ryo|no|gemmen|shinsei|wo|okonau|tai|desu|ga|, |noufu|sho|online|de|teishutsu|suru|baai|mochibun-|shomei|shomen|wa|dono|yo|ni|ba|yoi|ka (while|we|would|like|to|apply|for|patent|fee|reduction|exemption|for|joint|application|(|co-owned|right|)|, |how|should|we|submit|document|that|prove|equity|interest|in|case|where|we|submit|statement of|payment|online|?)", that is, 35 languages, is output for the input first document. The number of matching languages between the languages of the context related to the first document and languages of a context related to the second document (the whole of the home page of the Japan Patent Office) is counted, and matching of 35 symbols (languages) is displayed as a maximum value of the number of matching languages. Then, one document related to the context in which 35 symbols (languages) match is displayed (extracted) under a field of "Extraction result of a semantically similar context>>one closest context was found" in a lower portion of FIG. 7. File name of the extracted document is [data00000964.txt][3/21]. [3/21] indicates that document data of [data00000964.txt] is divided for each of a predetermined number of characters, the whole portion includes 21 pages, and the extracted document portion is the third page.

When the document extracted in FIG. 7 is depressed, details of the extracted document are displayed on the screen in FIG. 8 as a window different from the screen in FIG. 7. A context obtained by segmenting the second document portion into morphemes (languages) by morphological analysis is displayed in an upper portion of FIG. 8. Languages matching the languages in the context related to the first document are enclosed with rectangular frames. An original text before the second document portion is converted (encoded) into languages, is displayed in a lower portion of FIG. 8. The first document (long text) and the extracted document portion are semantically compared. The extracted document portion includes the same text as the first document, that is "kyodoshutsugan (kyoyutokkyoken) nitsuite tokkyoryono gemmenshinseiwo okonaitainodesuga, tokkyoryonofushowo onlinede teishutsusurubaai, mochibunwo shomeisuru shomenwa donoyoni teishutsusureba yoidesuka (while we would like to apply for patent fee reduction/exemption for joint application (co-owned patent right), how should we submit a document that proves equity interest in a case where we submit a statement of payment of the patent fee online?)". Thus, the extracted document portion can be said as a document semantically similar to the first document. It can be therefore said that a document similar to the first document input by the user could be easily extracted.

Example 2

Example 2 is an example of processing of extracting a document desired by the user from all documents to be extracted with one step (depression of the search button) using a document shorter than the long text illustrated in FIG. 7 (hereinafter, referred to as a medium-length text) as the first document in the embodiment of the present disclosure. The document desired by the user includes a plurality of expression forms, and is a plurality of documents semantically similar to the first document. In example 2, accuracy of document extraction is verified on the basis of a medium-length text obtained by reducing the number of languages from the long text used in FIG. 7 in example 1 and replacing part of terms with terms in different expressions. The medium-length text in the present example is "kyodoshutsugande gemmenshinseiwo surutokini onlinenobaaiwa, mochibunwoshomeisuru shomenwa dosureba yoinodesuka (in a case of online submission, how should we submit a document that proves equity interest upon application of fee reduction/exemption for joint application?)". Compared to the long text used in FIG. 7, the terms of "(kyoyutokkyoken) (co-owned patent right)", "tokkyoryo (patent fee)", "tokkyoryonofusho (statement of payment of the patent fee)", "teishutsu (submit)", and the like are deleted in the medium-length text. Further, the medium-length text includes terms replaced with different expressions, for example, "nitsuite" is replaced with "de", and "donoyoni" is replaced with "do". Still further, the term "toki" not existing in the long text used in FIG. 7 is added in the medium-length text. In view of user-friendliness, it seems to be normal to input simple terms and text to try to obtain an extraction result through document search. Thus, the medium-length text in example 2 can be assumed to be a document close to the document to be input to the input device 106 when the user actually uses the language processing apparatus 10. The user inputs the medium-length text in the search field in the input device 106 of the language processing apparatus 10 and depresses the search button. The medium-length text is converted into languages segmented in units of morpheme through processing of converting a document into languages to be performed by the CPU 101. In other words, the medium-length text is segmented in units of morpheme (language), converted into base forms of parts of speech related to respective languages, and after overlapping languages are deleted, a context that is a collection of the languages is output. In a case of the medium-length text, a context segmented into "kyodo|shutsugan|de|gemmen|shinsei|wo-|suru|toki|ni|online|no|baai|wa|,|mochibun|shomei|shomen|do|ba|yoi|desu|ka (in|a|case|of|online|submission|, |how|should|we|submit|document|that|proves|equity|interest|upon|application|fee|reduction|exemption|for|joint|application|?)", that is, 22 languages, is output for the first document through the processing of the language processing apparatus 10. The number of matching languages is counted between the languages of the context related to the first document and the languages of the context related to the second document portion divided from the second document (the whole of the home page of the Japan Patent Office), and matching of 21 symbols (languages) is displayed as a maximum value of the number of matching languages. Then, one document related to the context in which 21 symbols (languages) match is displayed (extracted).

Also in example 2, when the extracted document is depressed in a similar manner to FIGS. 7 and 8 in example 1, a detail screen of the extracted document is displayed as a window different from the screen of the extracted document. On the detail screen, the context obtained by segmenting the second document portion into morphemes (languages) by morphological analysis is displayed. Further, in example 2, an original text before the second document portion is converted (encoded) into languages, is displayed. The first document (medium-length text) is semantically compared with the extracted document portion. The extracted document portion includes a text semantically similar to the input document, that is, "kyodoshutsugan (kyoyutokkyoken) nitsuite tokkyoryono gemmenshinseiwo okonaitainodesuga, tokkyoryonofushowo onlinede teishutsusurubaai, mochibunwo shomeisuru shomenwa donoyoni teishutsusureba yoidesuka (while we would like to apply for patent fee reduction/exemption for joint application (co-owned patent right), how should we submit a document that proves equity interest in a case where we submit a statement of payment of the patent fee online?)". Thus, it can be said that the extracted document portion is a document semantically similar to the first document. It can be therefore said that the document similar to the first document input by the user could be easily extracted.

Example 3

Example 3 is an example of processing of extracting a document desired by the user from all documents for which a plurality of target contexts is set as extraction targets with only one step (depression of the button) using a document shorter than the medium-length text illustrated in example 2 (hereinafter, referred to as a short text) as the first document in the embodiment of the present disclosure. In example 3, accuracy of document extraction is verified on the basis of a short text obtained by reducing the number of languages from the medium-length text used in example 2 and replacing part of the terms with terms of different expressions. The short text in the present example is "gemmenshinseiwo shitainodesuga (we would like to apply for fee reduction/exemption)". Compared to the medium-length text used in example 2, the terms of "kyodo (joint)", "shutsugan (application)", "online", "mochibun (equity interest)", "shomei (prove)", "shomen (document)", and the like are deleted in the short text. Further, the terms are replaced with terms in different expressions, for example, "suru" is replaced with "shitai". In view of user-friendliness, it seems to be normal to input simple terms and texts to try to obtain an extraction result through document search. Thus, the short text in example 3 can be assumed to be a document closer to the document to be input to the input device 106 by the user actually using the language processing apparatus 10. The user inputs a document of the short text in the search field in the input device 106 of the language processing apparatus 10 and depresses the search button (one step). The short text is converted into languages segmented in units of morpheme through processing of converting a document into languages to be performed by the CPU 101. In other words, the short text is segmented in units of morpheme (language), converted into base forms of parts of speech related to respective languages, and after overlapping of languages is deleted, a context that is a collection of languages is output. In a case of the short text, a context segmented into "gemmen|shinsei|wo|suru|tai|no|desu|ga (we|would|like|to|apply|for|fee|reduction/exemption)", that is, eight languages is output for the first document through the processing of the language processing apparatus 10. The number of matching languages is counted between the languages of the context related to the first document and the languages of the context related to the second document portion, and matching of eight symbols (languages) is displayed as a maximum value of the number of matching languages. Then, a plurality of documents, that is, eight documents which are semantically similar and which are in a plurality of expression forms, related to the context in which eight symbols (languages) match are displayed (extracted).

Also in example 3, in a similar manner to FIGS. 7 and 8 in example 1, when the extracted document is depressed, a detail screen of the extracted document is displayed as a window different from the screen of the extracted document. On the detail screen, a context obtained by segmenting the second document portion into morphemes (languages) by morphological analysis is displayed. Further, in example 3, an original text before the second document portion is converted (encoded) into languages is displayed. When the first document (short text) is semantically compared with the extracted eight documents, all the extracted eight document portions include texts including meaning similar to meaning of the input document as follows. The above-described texts are specifically, "[PCT kokusai tokkyoshutsugan] keigenseido/kofukinseidono goannai ([PCT international patent application] guidance for reduction system/grant program)", "tesuryonadono gemmenseidowa tabitabi kaiseisaremasu (fee reduction/exemption program, or the like, is often revised)", "gemmenshinseishonadowo onlinede teishutsusurukotowa dekimasuka? (is it possible to submit an application form for fee reduction/exemption, or the like online?)", "kyodoshutsugan (kyoyutokkyoken) nitsuite tokkyoryono gemmenshinseiwo okonaitainodesuga . . . (we would like to apply for patent fee reduction/exemption for joint application (co-owned patent right . . . ))", "sangyogijutsuryoku kyokaho dai 19 jono tekiyowoukeru tokkyoshutsugannitsuite, gemmensochiwa tekiyosaremasuka? (is fee reduction/exemption applied to patent application subjected to Article 19 of the Industrial Technology Enhancement Act?)", "chushokigyono gemmensochino shinseini atatte . . . (to apply for fee reduction/exemption for small businesses . . . )", "chushokigyonadoeno gemmenzentaitoshiteno . . . (as a whole of fee reduction/exemption for small businesses, or the like . . . )", and " . . . shinsaseikyuno gemmenwa muzukashiiyo . . . ( . . . it is difficult to reduce/exempt a fee for request for examination . . . )". The input first document (short text) is "gemmenshinseiwo shitainodesuga (we would like to apply for fee reduction/exemption)". The extracted eight document portions include one of the terms "keigen (reduction)", "gemmen (fee reduction/exemption)", "gemmenshinsei (application for fee reduction/exemption)" and "gemmensochi (fee reduction/exemption)", and thus, it can be said that the eight document portions are documents semantically similar to the first document. Regarding the number of extracted documents, while the number of extracted documents is one for the long text and the medium-length text, the number of extracted documents is increased to eight for the short text. It seems to be easy for the user to confirm eight document portions and compare the eight document portions with the input first document. Thus, it can be said that a plurality of semantically similar document portions in a plurality of expression forms could be easily extracted from all texts which are similar to the target document input by the user and which become extraction targets, widely enough for the user to easily confirm the document portions and with one step (only depression of the button).

Example 4

Example 4 is an example of processing of deleting particles, and the like, from the short text indicated in example 3 and extracting the document desired by the user using only terms of nouns of "gemmen (fee reduction/exemption)" and "shinsei (application)" as the first document in the embodiment of the present disclosure. In the present example, "wo shitainodesuga (we would like to)" is deleted from the short text "gemmenshinseiwo shitainodesuga (we would like to apply for fee reduction/exemption)", and accuracy of document extraction is verified on the basis of the remaining term "gemmenshinsei (application for fee reduction/exemption)". In view of user-friendliness, it seems to be normal to input a simple term to try to obtain an extraction result through document search. Thus, the term in example 4 can be assumed to be a document further closer to the document to be input to the input device 106 by the user actually using the language processing apparatus 10. The user inputs the document that is the term in the search field in the input device 106 of the language processing apparatus 10 and depresses the search button. The term is converted into languages segmented in units of morpheme through processing of converting a document into languages to be performed by the CPU 101, and a context that is a collection of languages is output. In a case of the term, a context segmented into "gemmen|shinsei (fee|reduction|exemption|application)", that is, two languages is output through the processing of the language processing apparatus 10 for the first document. The number of matching languages is counted between the languages of the context related to the first document and the languages of the context related to the second document portion, and matching of two symbols (languages) is displayed as a maximum value of the number of matching languages. Then, 290 documents related to the contexts in which two symbols (languages) match are extracted.

Regarding the number of extracted documents, while the number of extracted documents is one for the long text and the medium-length text, and the number of extracted documents is eight for the short text, the number of extracted documents is increased to 290 for the present term. While 290 documents can include document portions similar to the document desired by the user, it is difficult for the user to visually confirm all the 290 documents. Thus, it cannot be said that documents similar to the first document, in the number small enough for the user to easily confirm the documents, could be extracted. To extract document portions similar to the document desired by the user, in the number small enough for the user to easily confirm the document portions, it can be said that it is effective to include in the first document, languages belonging to other parts of speech other than noun in addition to the term (in the present example, the nouns "gemmen (fee reduction/exemption)" and "shinsei (application)") in a similar manner to the long text in example 1, the medium-length text in example 2 and the short text in example 3. Examples of the languages belonging to other parts of speech other than noun can include a particle "wo", a verb "shi", an auxiliary verb "tai (would like to)", and the like in "wo shitainodesuga (we would like to)" in example 3.

Example of Document Extraction Processing by Language Processing System in Related Art An example of processing of extracting a document using a language processing system in related art will be described next using FIGS. 9 to 11 for comparison to the embodiment. Note that in the following processing example, a search system of the HP of the Japan Patent Office is used as an example of the language processing system in related art. To compare the language processing system in related art with the processing by the language processing apparatus 10 in the present disclosure, processing of the present search system is verified using a long text, a medium-length text, a short text and a term that are the same as or similar to those in example 1 to example 4.

Example 5

Figure 9:
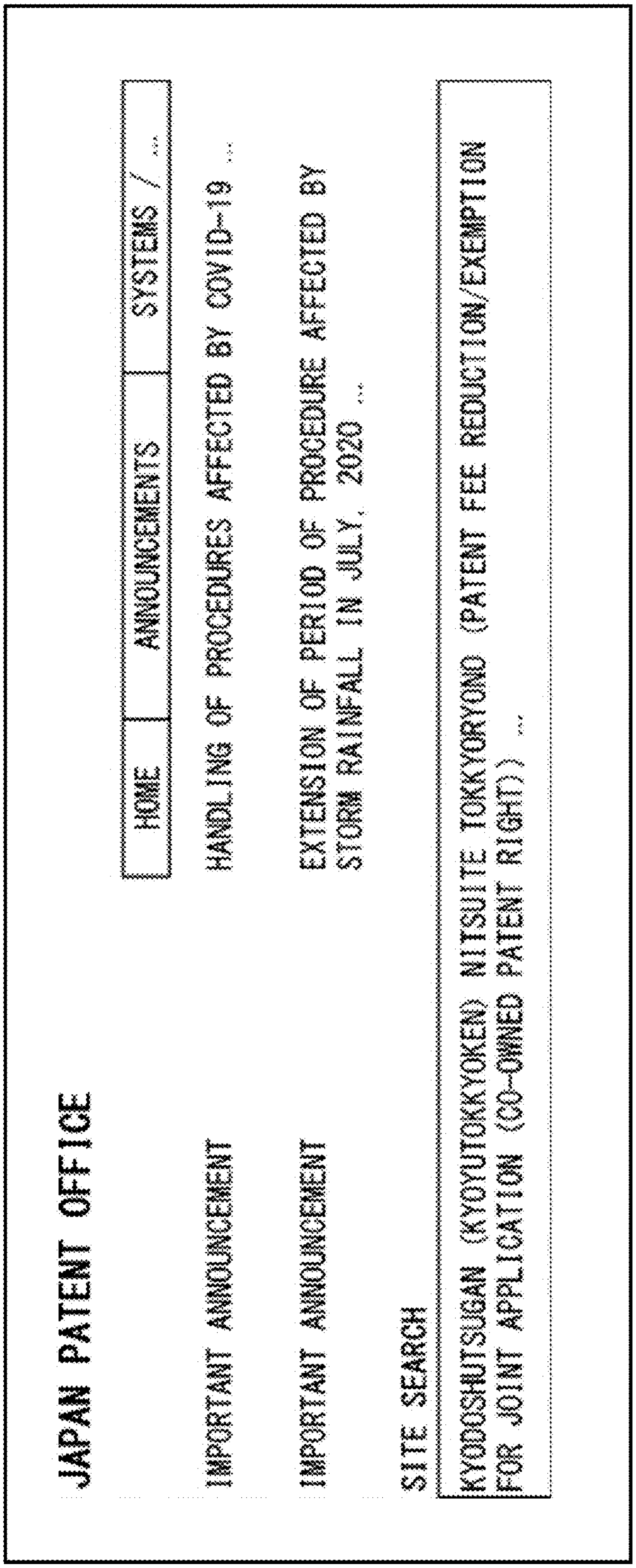
FIG. 9 is an example of processing of extracting a document in related art.
Figure 10:
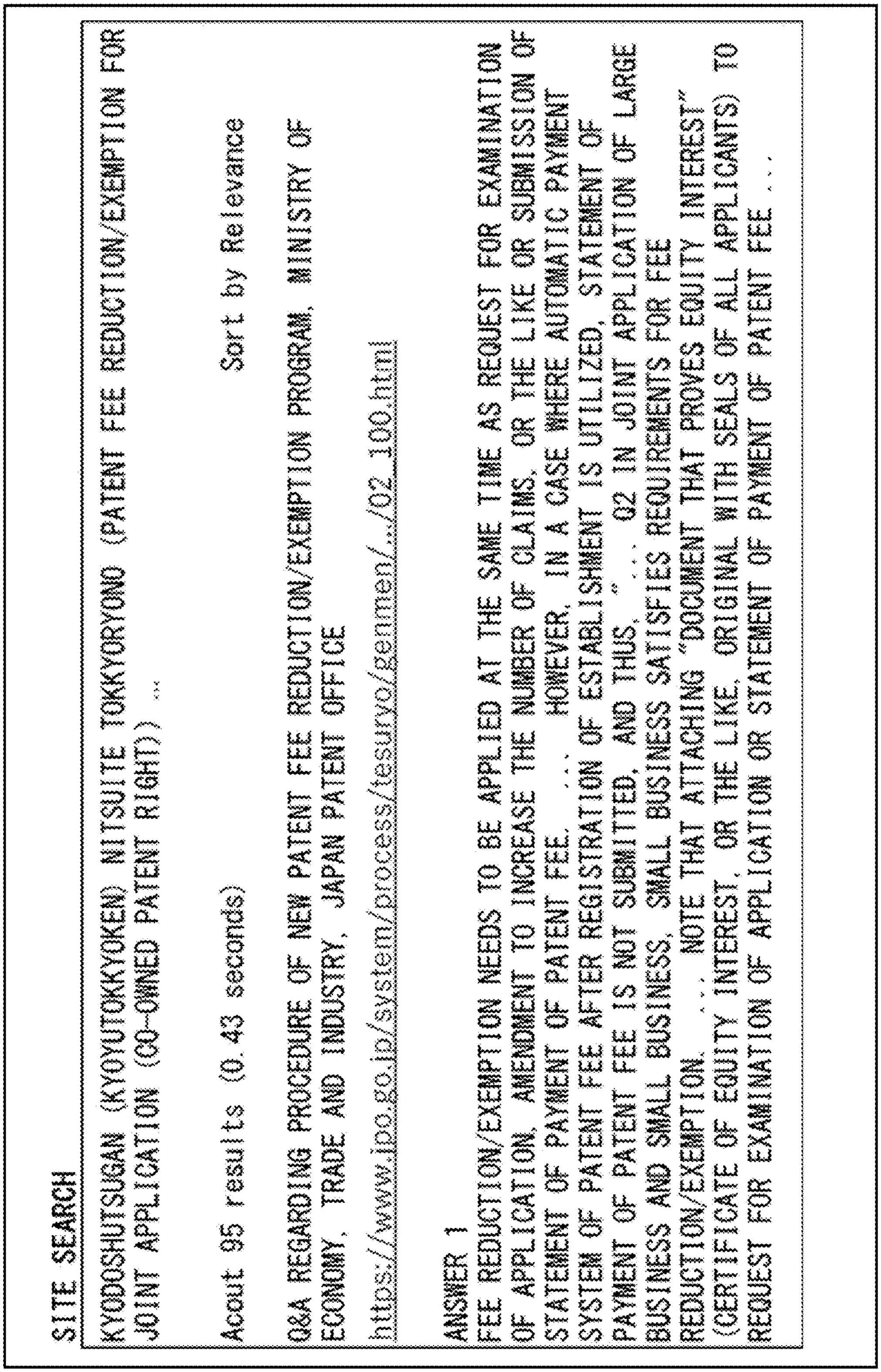
FIG. 10 is an example of processing of extracting a document in the related art.
Figure 11:
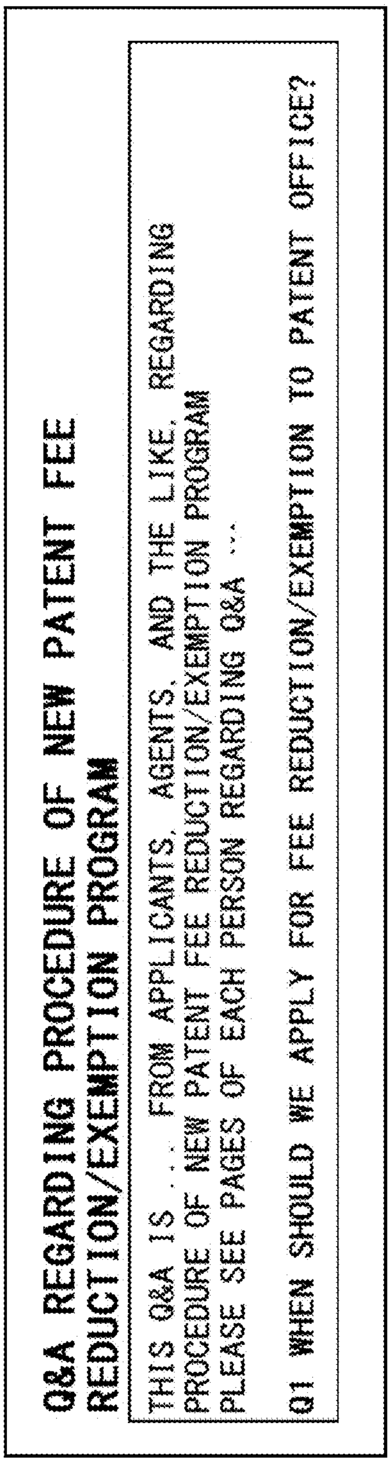
FIG. 11 is an example of processing of extracting a document in the related art.

FIGS. 9 to 11 are examples of processing of extracting a document desired by the user, using a long text as the first document, in related art. FIG. 9 is an example where the same document as that in example 1 is input in a search field of the search system of the HP of the Japan Patent Office that is related art (created by modifying reference: "Extraction examination of document similar to input document" (https://www.jpo.go.jp/) in a website of the Japan Patent Office). FIG. 10 is an example of an extraction result of a document based on the same document as that in example 1 (created by modifying reference: "Extraction examination of document similar to input document" (https://www.jpo.go.jp/) in a website of the Japan Patent Office). FIG. 11 is an example of a document displayed after a link of the document displayed as the extraction result is depressed (created by modifying reference: "Extraction examination of document similar to input document" (https://www.jpo.go.jp/system/process/tesuryo/genmen/genmen20190401/02_100.html) in a website of the Japan Patent Office). The figures illustrated in FIGS. 9 to 11 are figures in common with figures illustrating a series of processing related to search based on the same document as that in example 1 and document extraction. The figures are divided into FIGS. 9 to 11, because a screen related to FIG. 9 transitions to a screen in FIG. 10, the screen in FIG. 10 transitions to a screen in FIG. 11, and therefore it is difficult to illustrate these screens in one figure. Further, by fragmentarily illustrating the above-described series of processing separately in FIGS. 9, 10 and 11, points important in description of related art which will be described later, can be illustrated in close-up, which makes it easier to understand the related art.

As the long text of the present example, a long text of "kyodoshutsugan (kyoyutokkyoken) nitsuite tokkyoryono gemmenshinseiwo okonaitainodesuga, tokkyoryonofushowo onlinede teishutsusurubaai, mochibunwo shomeisuru shomenwa donoyoni teishutsusureba yoidesuka (while we would like to apply for patent fee reduction/exemption for joint application (co-owned patent right), how should we submit a document that proves equity interest in a case where we submit a statement of payment of the patent fee online?)" that is the same as that in example 1 is used. When the user inputs the long text in the search field in the search system of the HP of the Japan Patent Office and depresses a search button, the search system searches for documents similar to the input long text within the website of the HP of the Japan Patent Office. The search system organizes the searched documents in order of similarity to the long text and displays a document most similar to the long text and a link (such as a character string accessible to a specific URL) in an upper part of the search screen. In the example in FIG. 10, a link of "Q&A regarding new patent fee reduction/exemption program" is displayed in the upper part of the screen as the document most similar to the long text. When the user depresses the link, the screen transitions, and frequently asked questions (FAQ) regarding "Q&A regarding procedure of new patent fee reduction/exemption program" (FIG. 11) are displayed. The user needs to further confirm the screen of the above-described FAQ to extract documents similar to the target document input by the user. Thus, in the present example, it cannot be said that documents semantically similar to the target document could be easily extracted by the user inputting the first document.

Example 6

Example 6 is an example of processing of extracting a plurality of documents in a plurality of expression forms using a medium-length text as the first document in related art. As the medium-length text in the present example, a medium-length text of "kyodoshutsuganno gemmenshinseiwo shitainodesuga, onlinenobaai donoyoni teishutsusureba yoidesuka (while we would like to apply for fee reduction/exemption for joint application, in a case of online submission, how should we submit a document?)" that is similar to that in example 2 is used. When the user inputs the medium-length text in the search field in the search system of the HP of the Japan Patent Office and depresses the search button, the search system searches for documents similar to the input medium-length text within the website of the HP of the Japan Patent Office. The search system organizes the searched documents in order of similarity to the medium-length text and displays a document most similar to the medium-length text and a link in an upper part of the search screen. In example 6, a link of "Q&A regarding former fee reduction/exemption program" is displayed in an upper part of the screen as the document most similar to the medium-length text. When the user depresses the link, the screen transitions, and a link of frequently asked questions (FAQ) regarding "Q&A regarding former fee reduction/exemption program" and guidance for "general procedure of fee reduction/exemption application" are displayed. The user needs to further depress each link, confirm the guidance, or the like from the screen of the above-described FAQ to extract documents similar to the target document input by the user. Thus, in the present example, it cannot be said that documents semantically similar to the target document could be easily extracted by the user inputting the first document.

Example 7

Example 7 is an example of processing of extracting documents using a short text as the first document in related art. A short text of "gemmenshinseiwo shitainodesuga (we would like to apply for fee reduction/exemption)" that is the same as that in example 3 is used as the short text in the present example. When the user inputs the short text in the search field in the search system of the HP of the Japan Patent Office and depresses the search button, the search system searches for documents similar to the input short text within the website of the HP of the Japan Patent Office. The search system organizes the searched documents in order of similarity to the short text and displays a document most similar to the short text and a link in an upper part of the search screen. In example 7, a link of "Q&A regarding procedure of new fee reduction/exemption program" is displayed in the upper part of the screen as the document most similar to the short text. When the user depresses the link, the screen transitions, and frequently asked questions (FAQ) regarding "Q&A regarding procedure of new fee reduction/exemption program" are displayed. The user needs to further confirm the above-described FAQ to extract documents similar to the target document input by the user. Thus, in the present example, it cannot be said that documents semantically similar to the target document could be easily extracted by the user inputting the target document.

Example 8

Example 8 is an example of processing of extracting documents using a term as the first document in related art. A term "gemmenshinsei (application for fee reduction/exemption)" that is the same as that in example 4 is used as the term in the present example. When the user inputs the term in the search field in the search system of the HP of the Japan Patent Office, candidates for a search target term including the term are displayed in a pull-down menu. In a case of example 8, two terms of "gemmenshinsei (application for fee reduction/exemption)" and "gemmenshinseisho (application form of fee reduction/exemption)" including the term "gemmenshinsei (application for fee reduction/exemption)" are displayed. When the user depresses "gemmenshinseisho (application form of fee reduction/exemption)", the search system searches for documents similar to the input term within the website of the HP of the Japan Patent Office. The search system organizes the searched documents in order of similarity to the term and displays a document most similar to the term and a link in the upper part of the search screen. In example 8, a link of "forms of application forms for fee reduction/exemption, and the like" is displayed as the document most similar to the term in the upper part of the screen. When the user depresses the link, the screen transitions, and a link, or the like, to the forms of "application forms of patent fee reduction/exemption" is displayed as "forms of application forms for fee reduction/exemption, and the like". The user needs to confirm the above-described guidance, and the like, to extract documents similar to the target document input by the user. Thus, it cannot be said that documents semantically similar to the target document could be easily extracted by the user inputting the target document in the present example.

According to example 5 to example 8 described above, it cannot be said that documents desired by the user could be extracted through language processing using related art in either case where a long text, a medium-length text, a short text or a term is set as the first document. In contrast, in a case where the language processing apparatus 10 according to the present embodiment is used, it can be said that documents desired by the user could be extracted by performing language processing based on a long text, a medium-length text and a short text including particles, and the like, as the first document.

Conclusion

In the processing in the present embodiment, in the CPU 101 of the language processing apparatus 10, the input sentence acquisition unit 1013 acquires the first document input to the input device 106 by the user. The language extraction unit 1014 converts the first document into a context including languages segmented in units of morpheme on the basis of the dictionary of morphological analysis. The language organization unit 1015 accepts the languages output by the language extraction unit 1014 and deletes overlapping languages. The "language" indicates a segment obtained by segmenting a document in units of morpheme on the basis of the dictionary to be used in morphological analysis. The context refers to a collection of "languages" obtained by deleting overlapping morphemes and organizing the morphemes so as to include one word for each morpheme. In other words, the context is an example of a summary formed by acquiring words one by one from a document and leaving words that do not overlap with each other. Thus, the above-described processing can be said as part of first conversion processing of converting the first document into a document segmented into morphemes on the basis of the dictionary to be used in morphological analysis and deleting overlapping morphemes to generate a first summary, the first conversion processing being processing that a non-transitory storage medium storing a program causes a computer to execute.

The extracted document generation unit 1011 of the CPU 101 acquires a document to be extracted including languages corresponding to languages included in the first document input by the user from web content, and the like, on the basis of the languages included in the first document (step B1). The extracted document generation unit 1011 accepts the acquired document and converts the document into a context including languages segmented in units of morpheme on the basis of the dictionary to be used in morphological analysis (step B2). The extracted document generation unit 1011 deletes overlapping languages for each of the languages segmented in units of morpheme (step B4). Thus, the above-described processing can be said as part of second conversion processing of converting the second document determined to be relevant to the first document into a document segmented into morphemes on the basis of the dictionary to be used in morphological analysis and deleting overlapping morphemes to generate a second summary.

The target extraction unit 1016 acquires all document portions corresponding to target IDs of the document determined to be relevant to the first document on the basis of the languages included in the first document (step T5). The target extraction unit 1016 compares the languages related to the context of the first document and the languages related to the document portions of the second document and counts the number of matching languages (step T6). Thus, the above-described processing can be said as part of counting processing of counting the number of matching morphemes between the first summary obtained by deleting the overlapping morphemes from the morphemes of the first document and the second summary obtained by deleting the overlapping morphemes from the morphemes of the second document.

The target extraction unit 1016 obtains a maximum value of the number of matching languages between the languages related to the first document and the languages related to the document portions of the document determined to be relevant to the first document (step T8). The extraction result output unit 1017 outputs (extracts) a document portion with the maximum number of matching languages (step T9). Thus, the above-described processing can be said as part of extraction processing of determining relevance between the first document and the second document on the basis of a result of the counting processing and extracting part or all of the second document for which relevance to the first document satisfies a predetermined condition.

In the present embodiment, both the first document and the second document are segmented in units of language that is segmented into morphemes. The number of matching languages can be counted between the languages related to the first document and the languages related to the second document, relevance between the both documents can be determined on the basis of the number of matching languages, and a document with strong relevance (semantically similar) can be extracted from a plurality of documents in a plurality of expression forms. This eliminates the need for determination of parts of speech such as noun, verb, adjective, adjective verb, auxiliary verb and particle, that is a problem in a language processing technique in related art. Further, this eliminates the need for consideration of association between languages such as modification. The user can therefore easily extract documents semantically similar to the desired document.

Further, each of the language organization unit 1015 and the extracted document generation unit 1011 performs processing of deleting overlapping morphemes. This enables the target extraction unit 1016 to perform processing of counting the number of matching languages between the context related to the first document and the context related to the second document with the number of languages smaller than the number before deletion processing is performed, which makes processing easier. It is therefore possible to further easily extract documents semantically similar to the document desired by the user.

According to the embodiment, the language extraction unit 1014 converts the input first document into a document including languages segmented in units of morpheme on the basis of the dictionary of morphological analysis (step T3). The extracted document generation unit 1011 converts the document to be extracted, acquired from web content, or the like, into a document including languages segmented in units of morpheme on the basis of the dictionary to be used in morphological analysis (step S4). In the above-described processing in step T3 and step S4, processing of deleting morphemes (languages) from the document in accordance with types of parts of speech to which the morphemes (languages) belong is not performed. Thus, the above-described processing can be said as part of processing in which the segmented document converted by the first conversion processing and the second conversion processing includes all parts of speech obtained in a case where morphological analysis is executed.

Cases have been described in example 1 to example 3 where the segmented document converted by the first conversion processing and the second conversion processing includes all parts of speech obtained in a case where morphological analysis is executed. In these cases, the numbers of documents in a plurality of expression forms extracted by the language processing apparatus 10 as documents similar to the first document on the basis of the document are one in a case of example 1 (long text), one in a case of example 2 (medium-length text) and eight in a case of example 3 (short text). These numbers can be said as the numbers small enough for the user to easily confirm the documents. In contrast, the number of documents extracted by the language processing apparatus 10 as documents similar to the first document on the basis of example 4 (term) is 290. This number cannot be said as the number small enough for the user to easily confirm the documents. Only languages (of "gemmen (fee reduction/exemption)" and "shinsei (application)") belonging to noun are used as the term in example 4, and languages belonging to parts of speech other than noun (in a case of "wo shitainodesuga (we would like to)" in example 3, a particle "wo", a verb "shi" and an auxiliary verb "tai (would like to)", and the like) are deleted. Thus, it can be said that, as in example 1 to example 3, the segmented document converted by the first conversion processing and the second conversion processing preferably includes all parts of speech obtained in a case where morphological analysis is executed. By this means, document portions similar to the document desired by the user can be extracted in the number small enough for the user to easily visually confirm the document portions.

In the embodiment, the language extraction unit 1014 converts the first document into a document including languages segmented in units of morpheme on the basis of the dictionary of morphological analysis (step T3). In a case where parts of speech related to the respective languages include base forms, processing of replacing the languages segmented into morphemes with the base forms can be performed. The extracted document generation unit 1011 converts the second document into a document including languages segmented into morphemes on the basis of the dictionary to be used in morphological analysis (step S4). In a case where parts of speech related to the respective languages include base forms, processing of replacing the languages segmented into morphemes with the base forms can be performed. Thus, the above-described processing can be said as part of further execution of replacement processing of replacing morphemes in each of the first document and the second document with base forms of the parts of speech to which the morphemes belong, in the first conversion processing and the second conversion processing.

As a result of the languages related to the first document and the languages related to the second document being converted into base forms, matching of the languages can be determined by comparing the base forms of the languages, which can increase the number of matching languages as a whole. It is therefore possible to extract second document portions on the basis of the increased number of matching languages. Further, it is possible to easily extract a plurality of document portions in a plurality of expression forms semantically similar to the document desired by the user from all documents to be extracted.

In the embodiment, the extracted document generation unit 1011 divides the second document to be extracted into documents in units of page including a predetermined number of characters to create document portions (step S2). The target extraction unit 1016 compares the languages related to the first document and the languages related to each document portion of the second document determined to be relevant to the first document and counts the number of matching languages (step T6). Thus, the above-described processing can be said as part of processing of further executing division processing of dividing the second document into document portions each including a predetermined number of characters and counting the number of matching morphemes between the morphemes of the first document and morphemes of the divided document portions.

The second document is divided into document portions each including a predetermined number of characters, and the number of matching morphemes between the morphemes (languages) of the first document and morphemes (languages) of the document portions obtained by dividing the second document is counted. By this means, even in a case where the second document includes an enormous number of characters, the target extraction unit 1016 only requires to count the number of matching languages between the languages of the first document and the languages of the second document portions divided for each of a predetermined number of characters. This can facilitate the counting processing by the target extraction unit 1016.

In the embodiment, the extracted document generation unit 1011 divides the second document to be extracted into documents in units of page including a predetermined number of characters to create document portions (step S2). The target extraction unit 1016 compares the languages related to the first document and the languages related to the document portions of the second document determined to be relevant to the first document and counts the number of matching languages (step T6). Thus, the above-described processing can be said as part of processing of counting the number of matching morphemes between the morphemes of the first document and the morphemes of the divided document portions obtained by dividing the second document into document portions in units of file.

As a result of the second document being divided into document portions in units of file, the target extraction unit 1016 only requires to count the number of matching languages between the languages of the first document and the languages of a file corresponding to each of the second document portions divided for each of a predetermined number of characters. This can facilitate the counting processing by the target extraction unit 1016. Further, the extraction result output unit 1017 can extract documents similar to the first document from the second document portions in units of file. Thus, in a case where the user confirms the extracted documents, the user only requires to confirm only documents each including a predetermined number of characters included in the file. The user can therefore easily confirm the extracted documents.

In the embodiment, the extracted document generation unit 1011 converts each document portion related to the second document into a document without line breaks (step S3). Thus, the above-described processing can be said as part of further execution of deletion processing of deleting line breaks in a case where the second document includes line breaks.

When the second document includes a line break, the extracted document generation unit 1011 does not recognize characters before and after the line break as a series of morphemes, recognizes as respective morphemes upon morphological analysis and can perform morphological analysis on each of the morphemes. By converting each document portion related to the second document into a document without line breaks, appropriate morphological analysis (conversion processing to languages segmented into morphemes) can be performed on originally a series of morphemes. Thus, the target extraction unit 1016 can count the number of matching languages between the languages related to the first document and the languages related to the second document appropriately subjected to morphological analysis. It is therefore possible to appropriately extract document portions semantically similar to the document desired by the user.

In the embodiment, the user inputs the long text (first document) in the search field of the input device 106 in the language processing apparatus 10 and depresses the search button (one step). When depression of the search button is detected, the language extraction unit 1014 of the CPU 101 converts the long text into languages segmented in units of morpheme. In a case where parts of speech related to the respective languages include base forms, the languages are converted into the base forms of the languages. In a case where there are overlapping languages, overlapping of the languages is deleted and the languages are organized so as to include only one language for each language. Then, a context that is a collection of the languages is output. The number of matching languages between the languages included in the context related to the first document and the languages included in the context related to the second document is counted, and one document related to a context including a maximum value of the number of matching languages is extracted. Thus, the above-described processing can be said as part of processing of executing the first conversion processing, the second conversion processing, the counting processing and the extraction processing through operation using the input device with respect to the search button for which depression is to be detected.

The language processing apparatus 10 can execute the first conversion processing, the second conversion processing, the counting processing and the extraction processing and extract the document desired by the user by only detecting depression of the search button after the user inputs the first document. It is therefore possible to easily extract document portions semantically similar to the document desired by the user.

In the embodiment, the target extraction unit 1016 obtains a maximum value of the number of matching languages between the languages related to the first document and the languages related to the document portions of the second document determined to be relevant to the first document (step T8). The extraction result output unit 1017 extracts a document portion with the number of matching languages being maximum (step T9). The extraction result output unit 1017 outputs a document portion corresponding to a target ID with the maximum number of matching languages to the output device 107, and the processing ends (step T10). Thus, the above-described processing can be said as part of extraction of a document portion with the number of matching morphemes being maximum from the second document in the counting processing.

In the counting processing to be executed by the CPU 101, by extracting a document portion with the number of matching morphemes being maximum from the second document, it is possible to extract a document that is more likely to be semantically similar to the first document. Thus, the user can easily obtain documents semantically similar to the input first document.

Modification

In the present embodiment, processing in a case where the first document input to the input device 106 is a document expressed in Japanese has been described. However, it is assumed that the first document input to the input device 106 is a document expressed in language other than Japanese. Thus, in the present modification, processing with the assumption that the first document input to the input device 106 is a document expressed in language other than Japanese will be described while mainly focusing on differences from the present embodiment. Thus, description overlapping with the description of the present embodiment will be omitted.

The input sentence acquisition unit 1013 determines, for example, whether or not the input first document is a document expressed in Japanese. A publicly known method can be employed as a method for the input sentence acquisition unit 1013 to determine whether or not the input first document is a document expressed in Japanese. In a case where it is determined that the first document is a document expressed in language other than Japanese, the input sentence acquisition unit 1013 causes a computer system (hereinafter, referred to as a translation system) that supports translation to translate the document expressed in the language into Japanese (also referred to as first translation processing). The input sentence acquisition unit 1013 acquires the document translated by the translation system. Note that the input sentence acquisition unit 1013 may specify a type of the language related to the first document when determining whether or not the first document is a document expressed in Japanese. Specification of the type of the language related to the first document may be performed by the input sentence acquisition unit 1013. The type of the language related to the first document may be specified when the translation system translates the first document from the language other than Japanese into Japanese. The input sentence acquisition unit 1013 may acquire information on the type of the language specified by the translation system. The information on the type of the language specified or acquired by the input sentence acquisition unit 1013 may be stored in the main storage unit 102 or the external storage unit 105 in association with the first document. Examples of the translation system can include a system that performs machine translation, which can be utilized via the network N. However, the translation system is not limited to this. The translation system may be a system utilizing artificial intelligence (AI). The translation system may be a translation system in which a network is interposed among a plurality of translation systems. Examples of language other than Japanese can include English. However, language other than Japanese is not limited to English. Language other than Japanese may be Chinese or other kinds of language.

After the first translation processing is completed, the CPU 101 of the language processing apparatus 10 performs subsequent processing. Specifically, the first conversion processing of generating a first context and the second conversion processing of generating a second context are performed. Further, the counting processing of counting the number of matching morphemes on the basis of the first context and the second context and processing of extracting a plurality of document portions in a plurality of expression forms semantically similar to the document desired by the user are performed.

In the processing in the modification, the extraction result output unit 1017 determines whether or not the first document semantically similar to the extracted plurality of document portions is a document expressed in Japanese. In the determination, the extraction result output unit 1017 can refer to the type of the language related to the first document stored in the main storage unit 102 or the external storage unit 105. In a case where the first document semantically similar to the extracted plurality of document portions is a document expressed in Japanese, the extraction result output unit 1017 does not perform processing of translating the extracted plurality of document portions into original language. The extraction result output unit 1017 outputs the extracted plurality of document portions as the extraction result.

In a case where the first document semantically similar to the extracted plurality of document portions is not a document expressed in Japanese, the extraction result output unit 1017 performs processing of translating the extracted plurality of document portions into original language. The processing of translation is performed using the translation system. In other words, the extraction result output unit 1017 designates translation language to the translation system and causes the translation system to translate the extracted plurality of document portions (also referred to as second translation processing). The translation system to be used by the extraction result output unit 1017 is preferably the same translation system as the translation system used when the input sentence acquisition unit 1013 translates the first document from language other than Japanese into Japanese. By using the same translation system, a similar translation rule and algorithm are applied to the processing of translating the first document expressed in language other than Japanese into Japanese and the translation processing of translating the extracted plurality of document portions from Japanese into the language other than Japanese. Thus, use of the same translation system makes it possible to keep semantic similarity between the first document expressed in language other than Japanese and a plurality of document portions translated from Japanese into the language other than Japanese. However, the translation system to be used in the second translation processing is not limited to this. The translation system to be used in the second translation processing may be a translation system (other systems that support translation) different from the translation system used in the first translation processing. The extraction result output unit 1017 acquires a plurality of document portions translated by the translation system. Then, the extraction result output unit 1017 outputs the plurality of document portions translated into the language as the extraction result. However, a method for outputting the extraction result is not limited to this.

Thus, even in a case where a document expressed in language other than Japanese is input to the input device 106 as the first document, a plurality of documents in a plurality of expression forms semantically similar to the first document can be extracted. Further, the extracted documents can be output as documents translated into original language related to the first document. Thus, according to the processing in the modification, in a case where the first document is expressed in language other than Japanese, it is possible to easily extract documents similar to the document desired by the user and output documents translated into the language other than Japanese.

Example of Document Extraction Processing in Modification

Figure 12:
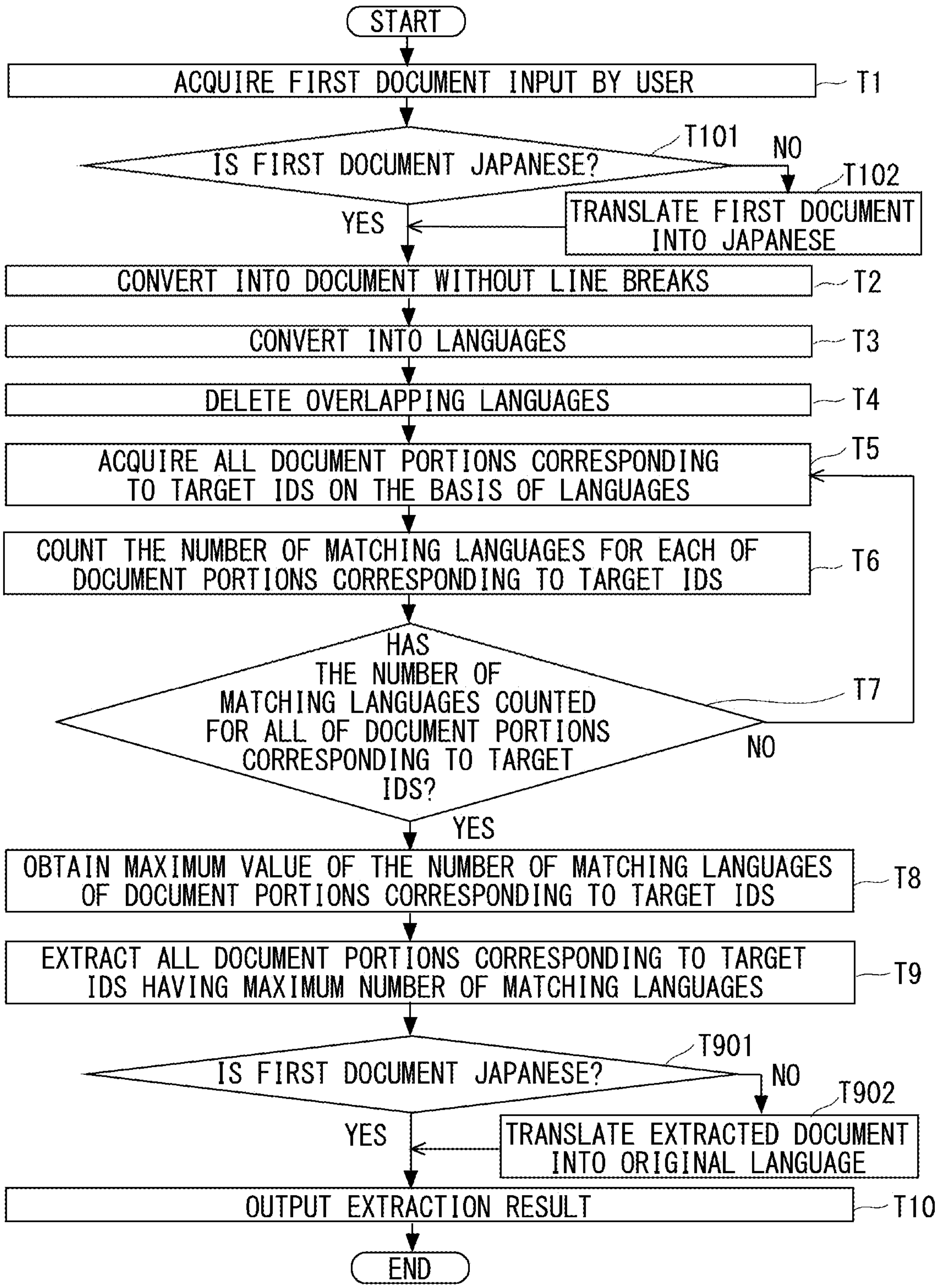
FIG. 12 is a flowchart illustrating an example of processing of a language processing apparatus in a modification of the present disclosure.

An example of document extraction processing in the modification will be described with reference to FIG. 12. Note that the processing in FIG. 12 partially overlaps document extraction processing in the present embodiment illustrated in FIG. 6. Thus, description overlapping with the description of FIG. 6 will be omitted, and portions different from the description of FIG. 6 will be mainly described.

The input sentence acquisition unit 1013 acquires a document (first document) which is input to the input device 106 by the user and which includes a term that the user desires to extract from the input device 106 (step T1). The input sentence acquisition unit 1013 determines whether or not the first document is a document expressed in Japanese (step T101). In the determination processing, the input sentence acquisition unit 1013 may specify a type of language related to the first document. In a case where the input sentence acquisition unit 1013 determines that the first document is a document expressed in Japanese (step T101: Yes), the processing proceeds to step T2. In other cases (step T101: No), the processing proceeds to step T102.

In step T102, the input sentence acquisition unit 1013 causes the translation system to translate the first document from document other than Japanese into Japanese. The input sentence acquisition unit 1013 acquires the document translated by the translation system. When the translation system performs translation processing, the translation system may specify the type of the language related to the first document. The input sentence acquisition unit 1013 may acquire information on the type of the language specified by the translation system. The information on the type of the language specified or acquired by the input sentence acquisition unit 1013 may be stored in the main storage unit 102 or the external storage unit 105 in association with the first document. Then, the processing from step T2 to step T9 is performed on the basis of the first document (document expressed in Japanese) or the document obtained by translating the first document from the language other than Japanese into Japanese.

The extraction result output unit 1017 determines whether or not the first document semantically similar to a plurality of document portions extracted in step T9 is a document expressed in Japanese (step T901). In the determination, the extraction result output unit 1017 can refer to the type of the language related to the first document stored in the main storage unit 102 or the external storage unit 105. In a case where the first document semantically similar to the extracted plurality of document portions is a document expressed in Japanese (step T901: Yes), the processing proceeds to step T10. The extraction result output unit 1017 outputs the extracted plurality of document portions, and the processing ends. In a case where the first document corresponding to the extracted plurality of document portions is not a document expressed in Japanese (step T901: No), the processing proceeds to step T902.

In step T902, the extraction result output unit 1017 performs processing of translating the extracted plurality of document portions into language (original language) related to the first document semantically similar to the plurality of document portions. The extraction result output unit 1017 designates a type of translation language to the translation system and causes the translation system to translate the extracted plurality of document portions. The type of the language to be designated is the type of the language related to the first document referred to by the extraction result output unit 1017 in the main storage unit 102 or the external storage unit 105. The translation system to be used by the extraction result output unit 1017 is preferably the same translation system as the translation system used when the input sentence acquisition unit 1013 translates the first document from the language other than Japanese into Japanese. However, the translation system to be used in the second translation processing is not limited to this. The translation system to be used in the second translation processing may be a translation system different from the translation system used in the first translation processing. The extraction result output unit 1017 acquires a plurality of document portions translated by the translation system. The extraction result output unit 1017 outputs the plurality of document portions translated into the language as the extraction result, and the processing ends.

As described above, the processing in the modification, even in a case where a document expressed in language other than Japanese is input to the input device 106 as the first document, a plurality of documents in a plurality of expression forms semantically similar to the first document can be extracted. Further, the extracted documents can be output as documents translated into original language related to the first document. Thus, according to the processing in the modification, in a case where the first document is expressed in language other than Japanese, it is possible to easily extract documents similar to the document desired by the user and output documents translated into the language other than Japanese.

In the above-described embodiment, the target extraction unit 1016 extracts a document portion with the number of matching languages being maximum between the languages related to the first document and the languages related to the second document portions divided for each of a predetermined number of characters. However, the processing of the target extraction unit 1016 is not limited to the above-described processing. Further, the language processing apparatus 10 may allow the user to freely designate a condition for a document to be output at the input device 106, or the like. For example, a document portion with the second largest number of matching languages may be extracted in addition to the document portion with the number of matching languages being maximum on the basis of designation by the user. Thus, in the above-described processing, the language processing apparatus 10 may cause document portions to be extracted from the second document on the basis of the condition designated by the user in the counting processing.

The above-described embodiment is merely an example, and the present embodiment can be modified as appropriate within a range not deviating from the gist. The processing and/or means described in the present embodiment can be partially taken out or freely combined upon implementation unless technical contradiction occurs.

In the above-described embodiment, the language processing apparatus 10 (CPU 101) acquires an operation signal from the input device 106 and executes language processing as illustrated in FIGS. 7 and 8 described above. However, at least part or all of the processing in FIGS. 7 and 8 may be executed by an apparatus other than the language processing apparatus 10. For example, other language processing apparatuses such as a server that can be accessed from the language processing apparatus 10 via the communication I/F 104 and the network N may execute at least part or all of the processing in FIGS. 7 and 8. The language processing apparatus 10 may receive a processing result executed by the other language processing apparatuses via the communication I/F 104 and the network N and output the processing result to the output device 107.

The present disclosure can be also implemented by supplying a computer program implementing the function described in the above-described embodiment to a computer and one or more processors of the computer reading out and executing the program. Such a computer program may be provided to the computer using a non-transitory computer readable storage medium that can be connected to a system bus of the computer or may be provided to the computer via a network. The non-transitory computer readable storage medium includes, for example, an arbitrary type of disk such as a magnetic disk (such as a floppy (registered trademark) disk and a hard disk drive (HDD)) and an optical disk (such as a CD-ROM, a DVD disk and a Blu-ray disk), a read only memory (ROM), a random access memory (RAM), an erasable programmable read only memory (EPROM), an electrically erasable programmable read-only memory (EEPROM), a magnetic card, a flash memory, an optical card, and an arbitrary type of medium appropriate for storing an electronic command.

The invention claimed is:

1. A non-transitory storage medium storing a program for causing a computer through operation using an input device with respect to a search button for which depression is to be detected:

first conversion processing to convert a first document into a document segmented into morphemes on a basis of a dictionary to be used in morphological analysis and to delete overlapping morphemes to generate a first summary;

second conversion processing to divide a second document determined to be relevant to the first document into document portions including a predetermined number of characters, to convert the second document into a document segmented into morphemes on a basis of the dictionary to be used in the morphological analysis and to delete overlapping morphemes to generate a second summary;

counting processing to count a number of matching morphemes between the first summary obtained by deleting the overlapping morphemes from the morphemes of the first document and the second summary obtained by deleting the overlapping morphemes from the morphemes of the second document; and extraction processing to determine relevance between the first document and the second document on a basis of a result of the counting processing and to extract part or all of the second document for which the relevance to the first document satisfies a predetermined condition, and wherein in the counting processing, a number of matching morphemes is counted between the morphemes of the first document and morphemes of the divided document portions.

2. The non-transitory storage medium storing the program according to claim 1, wherein documents converted and segmented through the first conversion processing and the second conversion processing include all parts of speech obtained in a case where the morphological analysis is executed.

3. The non-transitory storage medium storing the program according to claim 1, wherein the first conversion processing and the second conversion processing further cause replacement processing to replace the morphemes in each of the first document and the second document with base forms of parts of speech to which the morphemes belong.

4. The non-transitory storage medium storing the program according to claim 1, wherein the second document is divided into document portions in units of file, and in the counting processing, a number of matching morphemes is counted between the morphemes of the first document and morphemes of the divided document portions.

5. The non-transitory storage medium storing the program according to claim 1, further causing the computer:

deletion processing to delete a line break in a case where the second document includes the line break.

6. The non-transitory storage medium storing the program according to claim 5, wherein in the counting processing, a document portion with the number of matching morphemes being maximum is extracted from the second document.

7. The non-transitory storage medium storing the program according to claim 1, causing the computer:

determination processing to determine whether or not the first document is a document expressed in Japanese;

in reaction to a determination that the first document is a document expressed in language other than Japanese, first translation processing of causing a system that supports translation to translate the first document expressed in the language other than Japanese into a document expressed in Japanese; and second translation processing of causing the system that supports translation or other systems that support translation to translate the extracted part or all of the second document into a document expressed in the language.

8. A document extraction method to be performed by a computer through operation using an input device with respect to a search button for which depression is to be detected, the document extraction method comprising:

converting a first document into a document segmented into morphemes on a basis of a dictionary to be used in morphological analysis and deleting overlapping morphemes to generate a first summary;

converting a second document to divide the second document determined to be relevant to the first document into document portions including a predetermined number of characters, into a document segmented into morphemes on a basis of the dictionary to be used in the morphological analysis and deleting overlapping morphemes to generate a second summary;

counting a number of matching morphemes between the first summary obtained by deleting the overlapping morphemes from the morphemes of the first document and the second summary obtained by deleting the overlapping morphemes from the morphemes of the second document; and determining relevance between the first document and the second document on a basis of a result of processing of the counting and extracting part or all of the second document relevant to the first document, and wherein in the counting, a number of matching morphemes is counted between the morphemes of the first document and morphemes of the divided document portions.

9. A language processing apparatus comprising a processor through operation using an input device with respect to a search button for which depression is to be detected configured to execute:

converting a first document into a document segmented into morphemes on a basis of a dictionary to be used in morphological analysis and deleting overlapping morphemes to generate a first summary;

converting a second document to divide the second document determined to be relevant to the first document into document portions including a predetermined number of characters, into a document segmented into morphemes on a basis of the dictionary to be used in the morphological analysis and deleting overlapping morphemes to generate a second summary;

counting a number of matching morphemes between the first summary obtained by deleting the overlapping morphemes from the morphemes of the first document and the second summary obtained by deleting the overlapping morphemes from the morphemes of the second document; and determining relevance between the first document and the second document on a basis of a result of processing of the counting and extracting part or all of the second document relevant to the first document, and wherein in the counting, a number of matching morphemes is counted between the morphemes of the first document and morphemes of the divided document portions.

* * * * *